United States Patent
Yamada et al.

(10) Patent No.: US 9,358,945 B2
(45) Date of Patent: Jun. 7, 2016

(54) AIRBAG DEVICE FOR A FRONT PASSENGER SEAT

(71) Applicant: TOYODA GOSEI CO., LTD., Kiyosu-shi, Aichi-ken (JP)

(72) Inventors: Ikuo Yamada, Kiyosu (JP); Takanori Komatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/812,391

(22) Filed: Jul. 29, 2015

(65) Prior Publication Data

US 2016/0046254 A1  Feb. 18, 2016

(30) Foreign Application Priority Data

Aug. 12, 2014  (JP) ................................. 2014-164510
Jan. 28, 2015  (JP) ................................. 2015-014799

(51) Int. Cl.
| | |
|---|---|
| B60R 21/233 | (2006.01) |
| B60R 21/205 | (2011.01) |
| B60R 21/268 | (2011.01) |
| B60R 21/263 | (2011.01) |

(52) U.S. Cl.
CPC ............. *B60R 21/233* (2013.01); *B60R 21/205* (2013.01); *B60R 21/263* (2013.01); *B60R 21/268* (2013.01); *B60R 2021/23308* (2013.01)

(58) Field of Classification Search
CPC .. B60R 21/233; B60R 21/205; B60R 21/263; B60R 21/268; B60R 2021/23308
See application file for complete search history.

(56) References Cited

U.S. PATENT DOCUMENTS

| | | | | | |
|---|---|---|---|---|---|
| 4,262,931 | A | * | 4/1981 | Strasser ................ | B60R 21/233 280/729 |
| 5,129,675 | A | * | 7/1992 | Wang .................... | B60R 21/233 280/743.1 |

(Continued)

FOREIGN PATENT DOCUMENTS

| | | |
|---|---|---|
| JP | 56-67649 A | 6/1981 |
| JP | 02-303951 A | 12/1990 |

(Continued)

*Primary Examiner* — Faye M Fleming
(74) *Attorney, Agent, or Firm* — Posz Law Group, PLC

(57) ABSTRACT

An airbag housed in the housing and inflatable with an inflation gas for deployment rearward in order to protect a passenger in a front passenger seat. The airbag includes a main bag section that includes at its rear surface a front-collision arresting plane for catching the passenger upon a frontal collision, and an auxiliary bag section that includes an oblique-collision arresting section protruding rearward relative to the main bag section. The oblique-collision arresting section includes on its lateral an oblique-collision arresting plane for catching a head of the passenger upon an oblique collision. The oblique-collision arresting section is a high-pressure section which has a higher internal pressure than the main bag section when inflated. The airbag further includes in a front region of the auxiliary bag section a low-pressure section that is in gas communication with the main bag section and partitioned from the high-pressure section by a partition wall.

9 Claims, 22 Drawing Sheets

(56) References Cited

U.S. PATENT DOCUMENTS

| | | | | |
|---|---|---|---|---|
| 5,380,038 A | * | 1/1995 | Hawthorn | B60R 21/233 280/730.1 |
| 5,609,363 A | * | 3/1997 | Finelli | B60R 21/231 280/730.1 |
| 9,150,186 B1 | * | 10/2015 | Belwafa | B60R 21/233 |
| 9,162,645 B2 | * | 10/2015 | Cho | B60R 21/205 |
| 2015/0158452 A1 | * | 6/2015 | Choi | B60R 21/233 280/732 |
| 2015/0166002 A1 | * | 6/2015 | Fukawatase | B60R 21/233 280/730.1 |
| 2015/0175116 A1 | * | 6/2015 | Cho | B60R 21/205 280/729 |
| 2015/0258958 A1 | * | 9/2015 | Belwafa | B60R 21/233 280/729 |
| 2015/0258959 A1 | * | 9/2015 | Belwafa | B60R 21/233 280/729 |
| 2015/0307055 A1 | * | 10/2015 | Cheng | B60R 21/233 280/728.3 |
| 2015/0307056 A1 | * | 10/2015 | Cheng | B60R 21/205 280/729 |

FOREIGN PATENT DOCUMENTS

| | | |
|---|---|---|
| JP | 08-324373 A | 12/1996 |
| JP | 2003-182500 A | 7/2003 |
| JP | 2010-201980 A | 9/2010 |

* cited by examiner

AIRBAG DEVICE FOR A FRONT PASSENGER SEAT

CROSS REFERENCE TO RELATED APPLICATIONS

The present application claims priority from Japanese Patent Application No. 2014-164510 of Yamada et al., filed on Aug. 12, 2014 and Japanese Patent Application No. 2015-014799 of Yamada et al., filed on Jan. 28, 2015, the entire disclosure of which is incorporated herein by reference.

BACKGROUND OF THE INVENTION

1. Field of the Invention

The present invention relates to an airbag device for a front passenger seat whose airbag is deployable for catching a passenger (especially, his head) seated in a front passenger seat not only in the event of a frontal collision of a vehicle at which the passenger moves forward, but also in the event of an oblique collision of a vehicle at which the passenger moves diagonally forward in a left and right direction such as towards a driver's seat or towards an outboard direction.

2. Description of Related Art

JP S56-67649 discloses a known airbag device for a front passenger seat which includes in an airbag, in addition to a main bag section inflatable in front of a passenger seated in a front passenger seat, an auxiliary bag section (a center bag section) which is partitioned from the main bag section by a partition wall and is inflatable in front of a space between the front passenger seat and driver's seat. In this airbag, the rear face of the auxiliary bag section is flush with that of the main bag section along a left and right direction such that the airbag may restrain a passenger seated in a center seat disposed between the driver's seat and the front passenger seat. Further, the partition wall is provided with a check valve for allowing a gas flow into the auxiliary bag section and preventing a pressure plunge of the auxiliary bag section.

JP H2-303951 discloses an airbag device for a front passenger seat with an airbag which includes at an end region of its rear face at a side of the driver's seat an protruding section for catching the head of a passenger seated in the front passenger seat in the event of an oblique collision, such that the airbag cushions the passenger not only in the event of a frontal collision but also in the event of an oblique collision (including also an offset collision not only an instance where a vehicle crashes while moving diagonally forward).

However, the conventional airbag devices for a front passenger seat cannot catch a passenger (especially, his head) moving diagonally forward at oblique collision in an adequate fashion without turning the face of the passenger towards an outboard direction or an inboard direction.

That is, the airbag disclosed in the former reference has merely an increased volume on a side of the driver's seat and cannot catch a passenger without turning the passenger. The airbag disclosed in the latter reference is able to prevent the passenger's head from turning by the protruding section at cushioning to some extent. However, if the protruding section is deformed in such a manner as to fall down towards the driver's seat after cushioning the head, the protection will not be sufficient.

SUMMARY OF THE INVENTION

An object of the present invention is to provide an airbag device for a front passenger seat that is able to catch a passenger in an adequate fashion in the event of an oblique collision with its airbag.

The object of the invention will be achieved by a following airbag device for a front passenger seat:

The airbag device for a front passenger seat is adapted to be mounted on an instrument panel of a vehicle in front of a front passenger seat and includes a housing adapted to be disposed in the instrument panel and an airbag housed in the housing in a folded-up configuration and being inflatable with an inflation gas for deployment rearward in order to protect a passenger seated in the front passenger seat. The airbag includes:

an inflatable main bag section that includes at a rear surface thereof a front-collision arresting plane for catching the passenger moving forward in the event of a frontal collision of the vehicle;

an auxiliary bag section that is deployable on a lateral in a left and right direction of the main bag section and inflatable into such a shape as to protrude rearward relative to an edge in a left and right direction of the front-collision arresting plane, the auxiliary bag section including an oblique-collision arresting section that protrudes rearward relative to the main bag section, the oblique-collision arresting section including on a lateral thereof an oblique-collision arresting plane extending rearward in such a manner as to be continuous with the front-collision arresting plane for catching a head of the passenger moving diagonally forward in the event of an oblique collision of the vehicle;

a high-pressure section that is composed of a region of the auxiliary bag section including at least the oblique-collision arresting section and is higher in internal pressure than the main bag section when inflated; and a low-pressure section that is disposed in front of the oblique-collision arresting section in the auxiliary bag section, the low-pressure section being in gas communication with the main bag section and partitioned from the high-pressure section by a partition wall and having a lower internal pressure than the oblique-collision arresting section.

With the airbag device for a front passenger seat according to the invention, when the airbag completes deployment, the oblique-collision arresting section, which acts as the high-pressure section, of the auxiliary bag section protrudes rearward at a side of the front-collision arresting plane. The oblique-collision arresting plane of the oblique-collision arresting section will catch the passenger's head moving diagonally forward in the event of an oblique collision of the vehicle. Since the oblique-collision arresting section is the high-pressure section having high internal pressure, the oblique-collision arresting section will not likely to fall down (or dent) when catching the head, otherwise the passenger's head will be turned. Therefore, the oblique-collision arresting section will be able to catch and protect the passenger's head in an adequate fashion without turning the head.

In the event of a frontal collision of the vehicle, the front-collision arresting plane of the main bag section will catch the upper body of the passenger moving forward. The main bag section has an equal internal pressure to the low-pressure section which is lower in internal pressure than the high-pressure section. Further, the low-pressure section is located also in the area in front of the oblique-collision arresting section with a high pressure. Therefore, the front-collision arresting plane will be able to cushion the passenger moving forward without being affected by the rigidity (shape retention property) of the oblique-collision arresting section composed of the high-pressure section.

If, hypothetically, no low-pressure section is provided and the high-pressure oblique-collision arresting section is disposed up to the front end of the auxiliary bag section with the same width in a left and right direction, the rigidity of the airbag at deployment will be enhanced due to such an oblique-collision arresting section. With such a configuration, when the front-collision arresting plane catches head on the passenger moving forward, the region of the front-collision arresting plane disposed towards the oblique-collision arresting section would not dent, and the front-collision arresting plane would slant in such a manner as to face towards an opposite direction from the auxiliary bag section with its edge facing away from the auxiliary bag section moved forward while its edge facing towards the auxiliary bag section staying at the rear. As a result, the front-collision arresting plane would fail to arrest the passenger and let him slip towards a direction away from the auxiliary bag section, and therefore would not be likely to protect the passenger adequately.

Therefore, with the airbag device for a front passenger seat according to the invention, the airbag will be able to catch the passenger's head in the event of an oblique collision of the vehicle as well as cushion the passenger smoothly in the event of a frontal collision of the vehicle.

In the airbag device described above, it is desired that:
an inflator is disposed in the housing for feeding an inflation gas to the airbag;
the main bag section is so deployable as to extend rearward from the housing; and
the high-pressure section includes in the partition wall a check valve acting as an inflation gas supply mechanism, the check valve allowing the inflation gas to flow into the high-pressure section from the low-pressure section and preventing the gas from flowing into the low-pressure section from the high-pressure section.

With this configuration, once the inflation gas emitted from the inflator has flown into the high-pressure section from the main bag section via the low-pressure section, the check valve on the partition wall acting as the inflation gas supply mechanism prevents the gas from flowing back into the low-pressure section, thus maintaining a higher pressure in the high-pressure section compared to the low-pressure section in a steady fashion. The low-pressure section and high-pressure section are merely partitioned by the partition wall provided with the check valve, and the low-pressure section and high-pressure section share the same inflator, which does not complicate the configuration of the airbag device.

The airbag device for a front passenger seat of the invention may also be configured such that:
at least two inflators are disposed in the housing for feeding an inflation gas to the airbag; and
the high-pressure section is fed with an inflation gas by one of the inflators via an inner tube that extends from a periphery of the one inflator and acts as an inflation gas supply mechanism.

With such a configuration as well, the high-pressure section will be able to maintain a higher pressure than the low-pressure section in a steady fashion since the high-pressure section is fed with an inflation gas from the one inflator only via the inner tube acting as the inflation gas supply mechanism. Further, such a configuration will help control an internal pressure value, a start timing of pressure rise, a pressure-holding time or the like of each of the high-pressure section and low-pressure section adequately by adjusting an output, an actuation timing, a peak-pressure timing of each of the inflators.

In the airbag device for a front passenger seat of the invention, when viewing the airbag as fully deployed from above, the partition wall of the airbag is desirably configured to extend diagonally forward from its rear end located at a vicinity of a border between the front-collision arresting plane and the oblique-collision arresting plane. The front end of the partition wall may be located in a front end region of the auxiliary bag section not beyond an intersecting region of the front end region of the auxiliary bag section and a lateral of the auxiliary bag section, or at a lateral of the auxiliary bag section.

Alternatively, the partition wall may be configured, when viewing the airbag as fully deployed from above, to extend from the border between the front-collision arresting plane and the oblique-collision arresting plane in such a manner as to elongate the front-collision arresting plane, and be connected to the lateral of the auxiliary bag section.

Moreover, in the airbag device for a front passenger seat of the invention, the auxiliary bag section of the airbag desirably includes at its front end at deployment a support plane that is supported by a rear surface of the instrument panel at airbag deployment.

This configuration will prevent the auxiliary bag section from moving forward at full deployment since the support plane is supported by the rear surface of the instrument panel. Therefore, the oblique-collision arresting section will not easily move forward and be able to arrest a passenger without turning him.

Furthermore, in the airbag device of the present invention, the auxiliary bag section is desirably disposed on a lateral of the main bag section deployable facing towards a driver's seat of the vehicle.

This configuration will help the oblique-collision arresting section to catch the passenger's head moving diagonally forward and towards the front of the driver's seat in an adequate fashion and without turning it in the event of an oblique collision of the vehicle.

In such an instance, it is desired, when viewing the airbag as fully deployed from above, that:
the partition wall of the airbag extends diagonally forward and toward the driver's seat from the rear end of the partition wall located at the vicinity of the border between the front-collision arresting plane and the oblique-collision arresting plane; and
the front end of the partition wall is located farther forward relative to a steering wheel disposed in front of the driver's seat.

This configuration will enable the high-pressure section including the oblique-collision arresting section of the auxiliary bag section to be supported by an airbag for the driver's seat and steering wheel, and the oblique-collision arresting section will be able to catch the passenger moving diagonally forward without oscillating toward the driver's seat.

DESCRIPTION OF PREFERRED EMBODIMENTS

Figure 1:
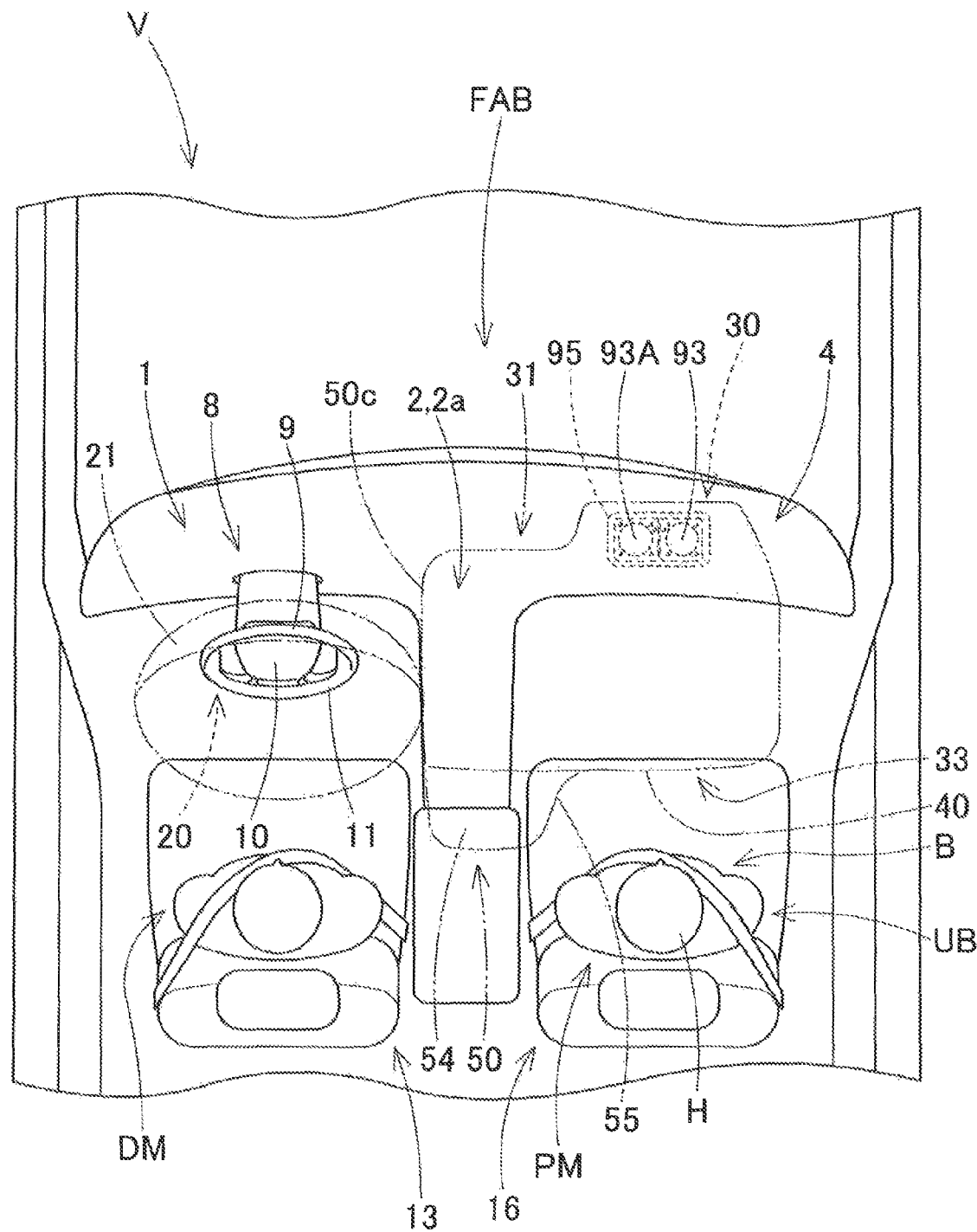
FIG. 1 is a schematic plan view of an airbag device for a front passenger seat according to the first embodiment of the invention.

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

FIGS. 1 to 5 depict an airbag device 30 for a front passenger seat according to a first embodiment of the invention. The airbag device 30 is mountable on a region of an instrument panel or dashboard 1 disposed in front of a front passenger seat 16 of a vehicle V. That is, the airbag device 30 is mounted on a passenger seat side region 4 of the dashboard 1. The airbag device 30 includes an airbag 31, which is folded up and stored in the passenger seat side region 4, two inflators 93 and 93A for supplying the airbag 31 with an inflation gas, a case or housing 95 for housing and holding the airbag 31 and inflators 93 and 93A, and an airbag cover 97 for covering the airbag 31 from above.

Unless otherwise specified, front/rear, up/down and left/right directions in this specification are intended to refer to front/rear, up/down and left/right directions of the vehicle V.

Figure 3:
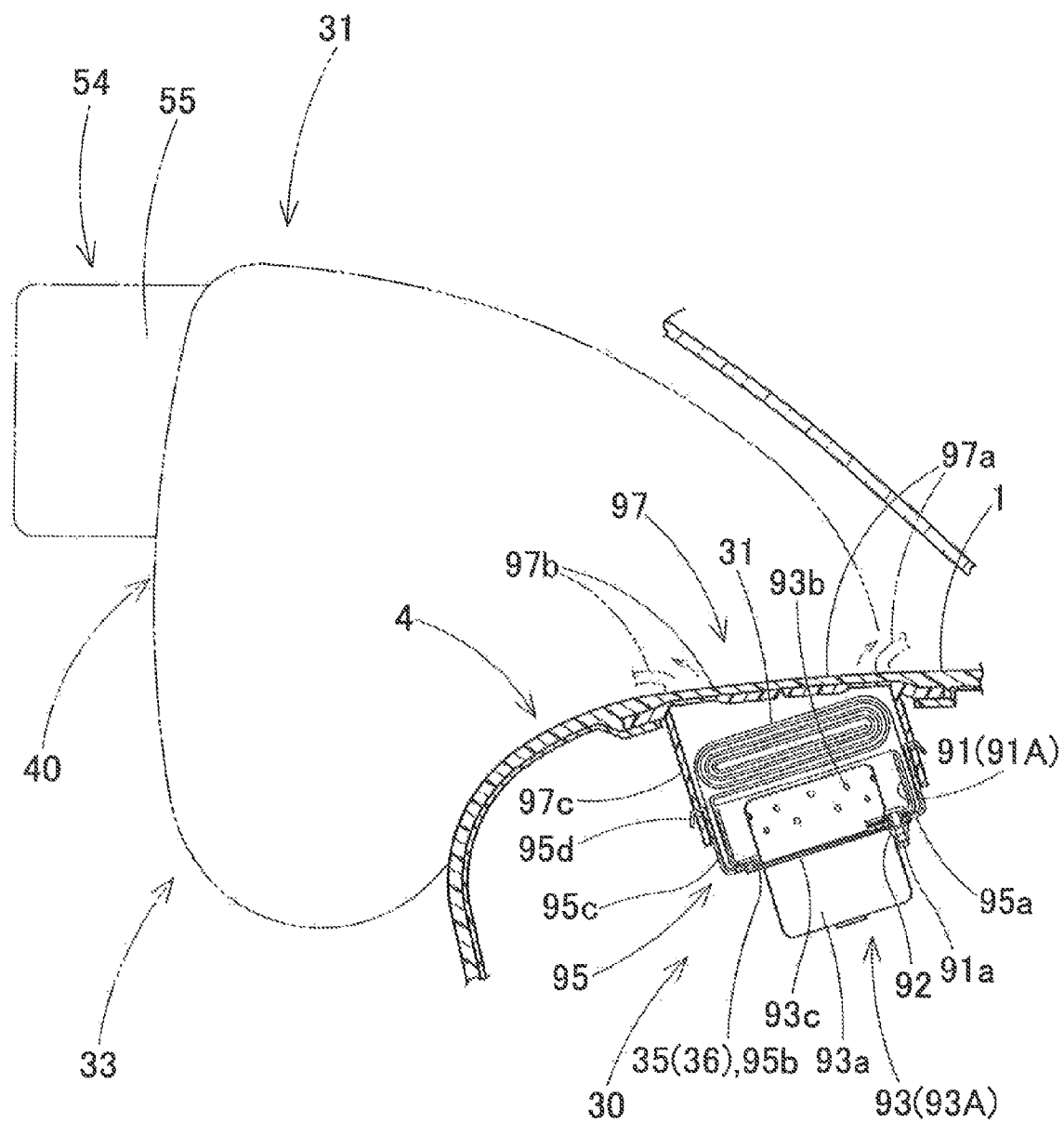
FIG. 3 is a schematic vertical section of the airbag device of the first embodiment.

As shown in FIG. 3, the airbag cover 97 is mounted on the passenger seat side region 4 of the dashboard 1 and includes two doors 97a and 97b adapted to open forward and rearward when pushed by the airbag 31 upon airbag deployment. The airbag cover 97 further includes around the doors 97a and 97b a side wall 97c extending downward.

As shown in FIG. 3, the case 95 serves as a housing of the airbag 31. The case 95 is made of sheet metal into a generally rectangular parallelepiped opening upward, and includes a generally rectangular bottom wall 95a and a circumferential wall 95c extending upward from an outer edge of the bottom wall 95a. The bottom wall 95a is provided with two round openings 95b (FIG. 4) for receiving main bodies 93a of the inflators 93 and 93A from below and mounting holes (reference numeral omitted) formed at a periphery of each of the openings 95b, for receiving bolts 91a of retainers 91, 91A. The circumferential wall 95c is provided at the top with hooks 95d for retaining the side wall 97c of the airbag cover 97 (FIG. 3). Not-shown mounting members are attached to the bottom wall 95a and circumferential wall 95c of the case 95 to be secured to a bracket extending from a dashboard reinforcement. The mounting members mount and secure the airbag device 30 to the vehicle body structure of the vehicle V.

Each of the inflators 93 and 93A includes a columnar main body 93a and a square annular flange 93c disposed on the outer circumference of the main body 93a. Each of the main bodies 93a is provided at the upper region with gas discharge ports 93b for emitting inflation gas G. Each of the flanges 93c includes through holes (reference numeral omitted) for receiving the bolts 91a of the retainer 91 or 91A.

The retainers 91 and 91A attach the airbag 31 and inflators 93 and 93A to the case 95. Each of the retainers 91 and 91A is square annular in shape such that the main body 93a of the inflator 93/93A goes therethrough, and is provided, at its four corners, with bolts 91a protruding downward. Each of the retainers 91 and 91A is placed on the periphery of the inlet port 35/36 of the airbag 31 inside the airbag 31 such that the bolts 91a protrude out of the mounting holes 37 of the airbag 31, and the bolts 91a, as the retainers 91 and 91A are housed inside the airbag 31, are put through the peripheries of the openings 95b of the bottom wall 95a of the case 95 and flanges 93c of the inflators 93 and 93A for nut 92 fastening. Thus the airbag 31 and inflators 93 and 93A are secured to the bottom wall 95a of the case 95.

Referring to FIGS. 4 to 8, the airbag 31 as fully deployed includes an upper wall 31c deployable at the upper side, a lower wall 31d deployable at the lower side, a left wall 31e deployable towards the driver's seat 13, i.e., on the left side, a right wall 31f deployable on the right side and a rear wall 31g deployable at the rear and having a stepped structure. The outer contour of the airbag 31 as fully deployed is a generally triangular prism extending in a left and right direction and narrowing forward in dimension in an up and down direction. The airbag 31 is composed of a main bag section 33 so deployable as to extend rearward from the case 95 and an auxiliary bag section 50 deployable towards the driver's seat 13, i.e., on the left side of the main bag section 33.

The rear surface 33b of the main bag section 33, which is deployable generally vertically, serves as a front-collision arresting plane 40 that catches the upper body UB including the head H and thorax B of a passenger PM seated in the front passenger seat 16 in the event of a frontal collision of the vehicle V at which the passenger PM moves forward. The lower surface of the front end region 33a of the main bag section 33 serves as a mounting section 34 to be attached to the bottom wall 95a of the case 95. The mounting section 34 is provided with two round inlet ports 35 and 36 for receiving the inflators 93 and 93A from below. The peripheries of the inlet ports 35 and 36 are pressed down against the bottom wall 95a of the case 95 by the retainers 91 and 91A. Around the inlet ports 35 and 36 are mounting holes 37 for receiving the bolts 91a of the retainers 91 and 91A.

The main bag section 33 further includes a vertical tether 42 that connects the mounting section 34 and front-collision arresting plane 40 in order to steady the distance between the front-collision arresting plane 40 and mounting section 34 at airbag deployment. The front end 42a of the vertical tether 42 is pressed down against the bottom wall 95a of the case 95 by the retainers 91 and 91A while the rear region of the tether 42 is doubled on a crease extending in a front and rear direction and jointed to tongue sections 81a and 82a extending from the center in a left and right direction of the front-collision arresting plane 40.

Figure 6:
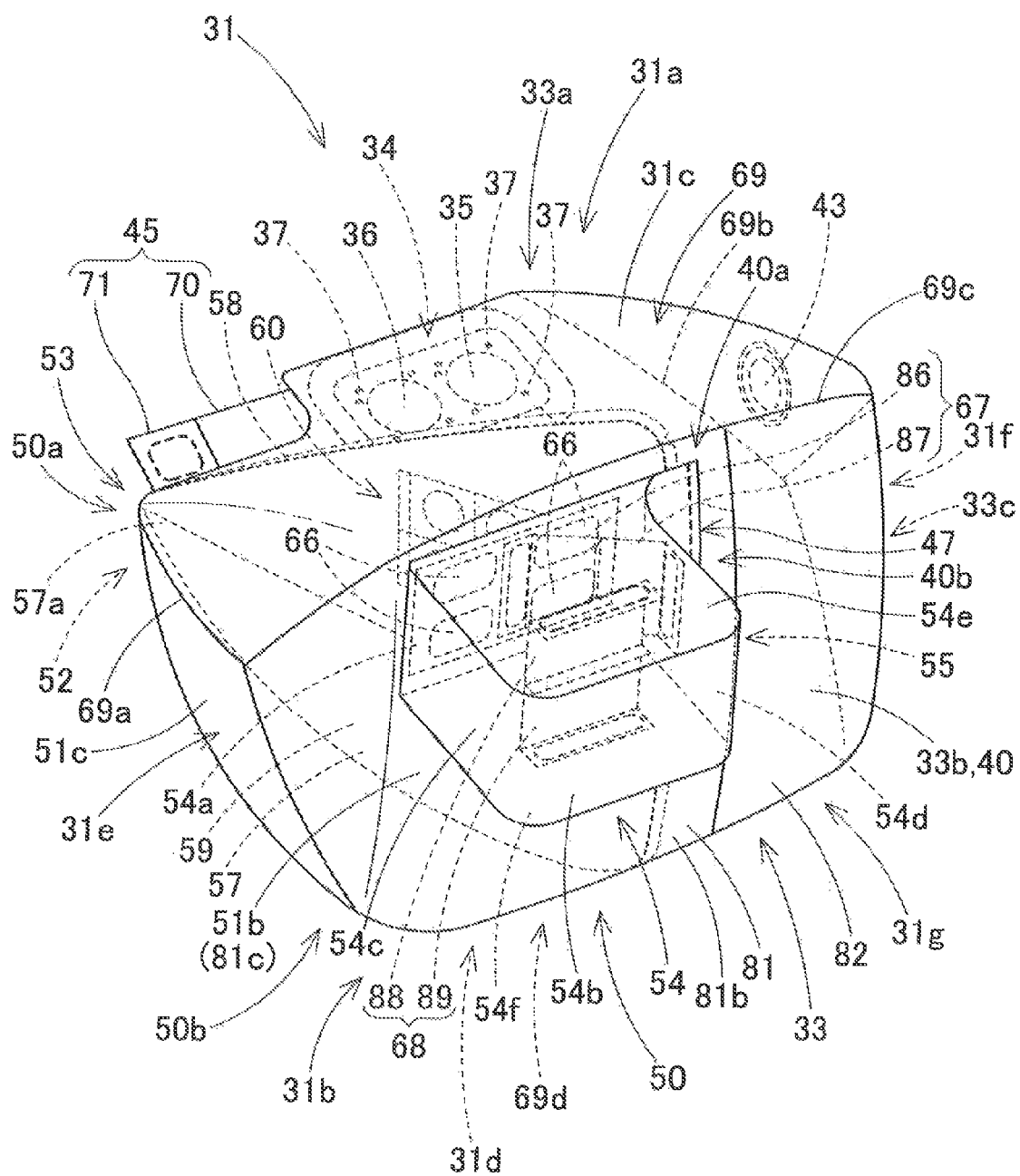
FIG. 6 is a schematic perspective view of an airbag of the first embodiment as fully inflated.
Figure 7:
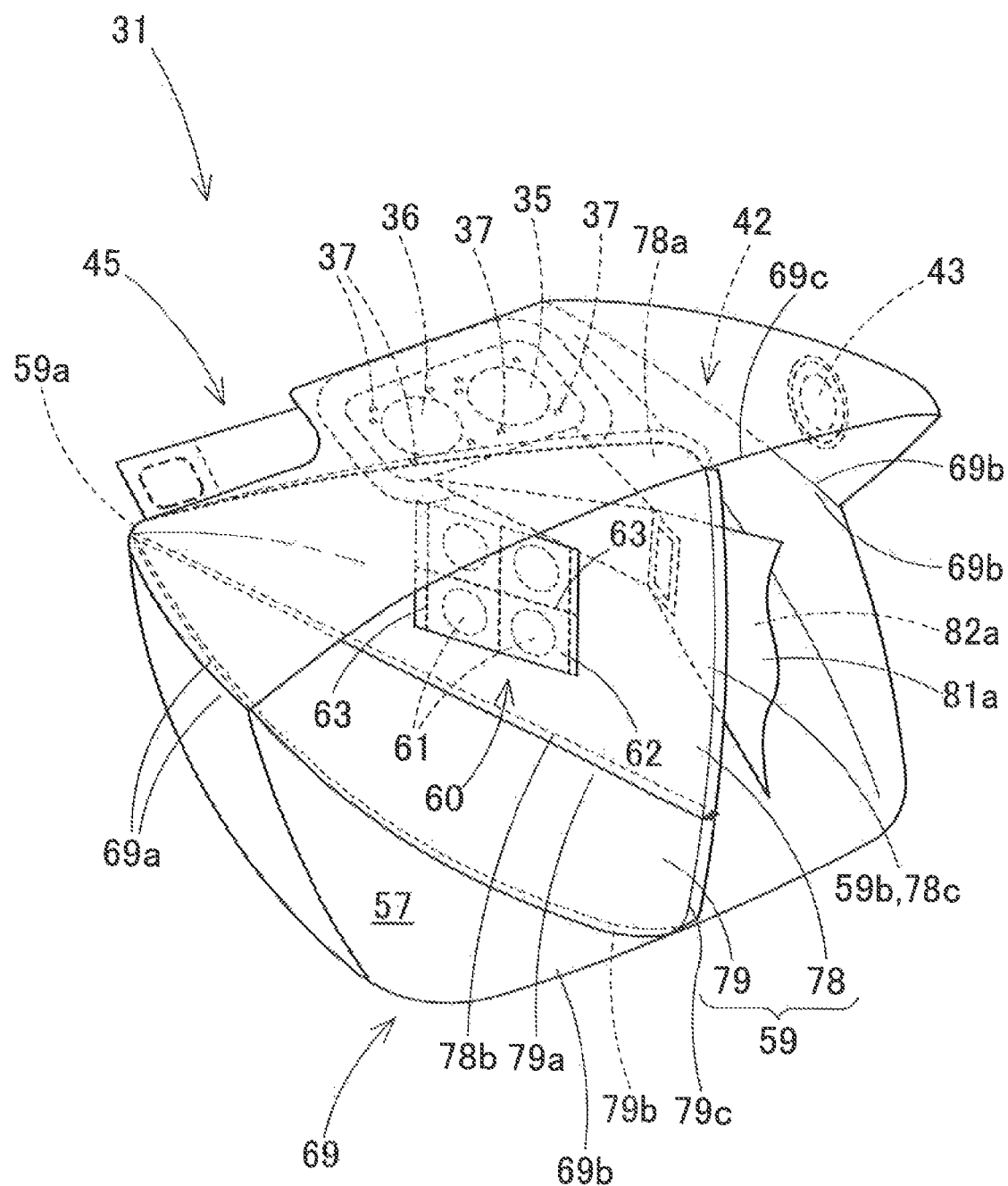
FIG. 7 is a partially broken schematic perspective view of the airbag of the first embodiment as fully inflated.
Figure 8:
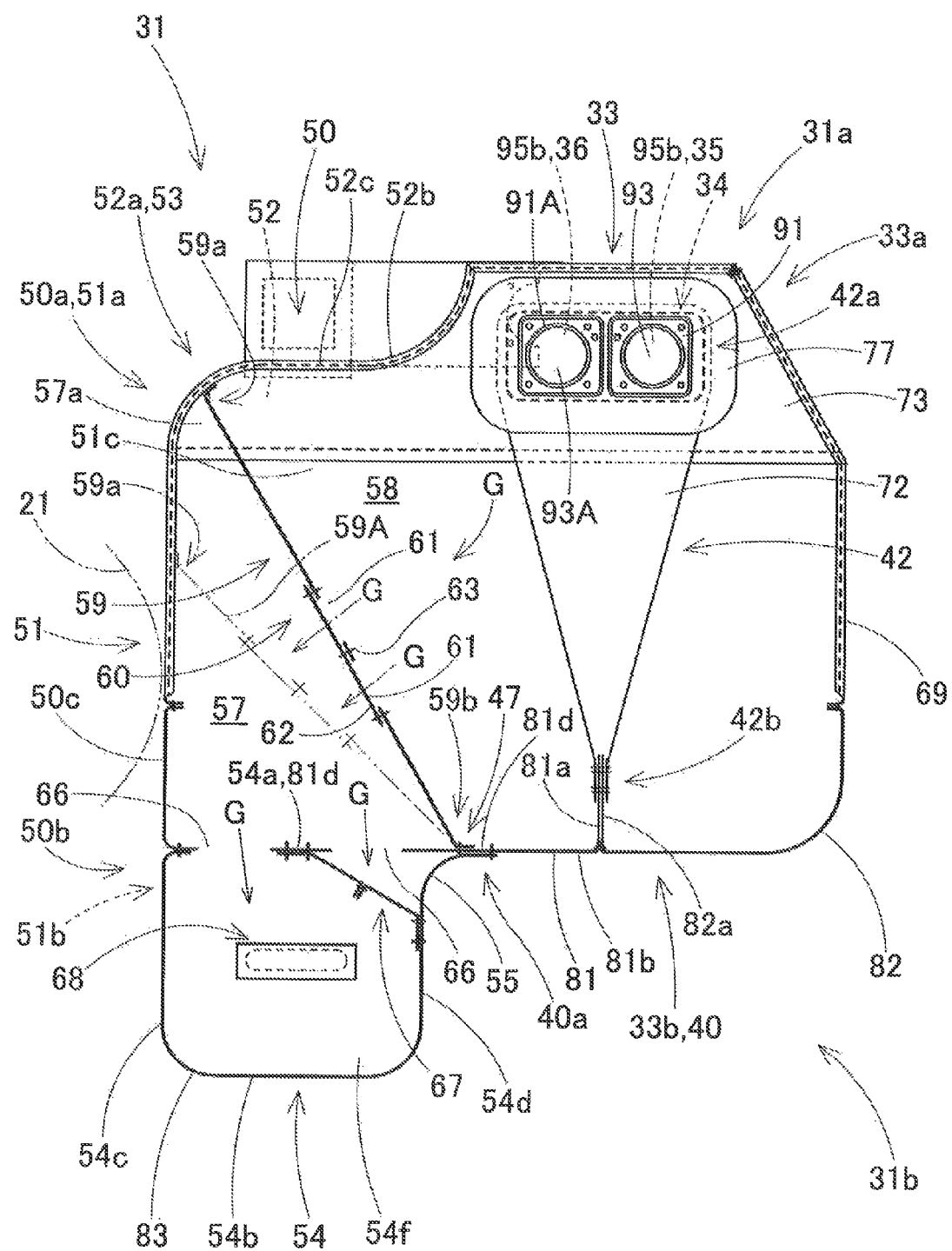
FIG. 8 is a schematic horizontal section of the airbag of the first embodiment as fully inflated.

The rear plane of the airbag 31 is composed of rear panels 81 and 82 (FIG. 11) each of which forms the left region and right region of the rear plane. The rear panels 81 and 82 are sewn together vertically by the regions proximate the tongue sections 81a and 82a such that the tongue sections 81a and 82b protrude forward, thus forming the front-collision arresting plane 40. The rear panel 81 disposed on the left side constitutes the front-collision arresting plane 40 by its right side region 81b disposed towards the tongue section 81a as shown in FIG. 8. The rear panel 81 also constitutes a rear surface 51b of a later-described support inflatable region 51 of the auxiliary bag section 50 and a front wall 54a of a later-described oblique-collision arresting section 54 by its left side region 81c (FIG. 6).

The main bag section 33 further includes on the right side 33c a vent hole 43.

Moreover, an outer tether 45 is attached to the mounting section 34 of the main bag section 33 with the aid of the retainer 91A. The outer tether 45 is jointed to the front end 51a of the auxiliary bag section 50 at the outside for preventing the front region 50a of the auxiliary bag section 50 from protruding toward the driver's seat 13.

The auxiliary bag section 50 is deployable at a side of the main bag section 33 towards the driver's seat 13. The auxiliary bag section 50 includes a support inflatable region 51 disposed on the front region 50a and an oblique-collision arresting section 54 disposed on the rear region 50b. The oblique-collision arresting section 54 is inflatable into a generally rectangular parallelepiped and is so formed as to protrude rearward partially from an upper region of the rear surface 51b of the support inflatable region 51. The front end 51a of the support inflatable region 51 extends towards the main bag section 33 generally along a left and right direction from the front end (or intersecting region 53) of the lateral 50c facing towards the driver's seat 13 and extends up to the rear surface 2a of the center cluster 2 of the dashboard 1. The lower surface of the front end region 51a of the support inflatable region 51 serves as a support plane 52 supported by the rear surface 2a of the center cluster 2 at airbag deployment.

The oblique-collision arresting section 54 is provided in order to catch the head H of a passenger PM moving diagonally forward toward the driver's seat in the event of an oblique collision (including an offset collision as well as an oblique collision) of the vehicle V. That is, the oblique-collision arresting section 54 is so formed as to protrude rearward from an upper region of the edge of the front-collision arresting plane 40 facing towards the driver's seat 13, i.e., from an upper region 40b of the left edge 40a of the front-collision arresting plane 40. A lateral region of the oblique-collision arresting section 54 continuous with the front-collision arresting plane 40 serves as an oblique-collision arresting plane 55 for catching the head H of the passenger PM moving diagonally forward toward the driver's seat 13 in the event of an oblique collision.

As shown in FIGS. 6 and 8, as seen from the viewpoint of components of the airbag 31, the oblique-collision arresting section 54 of the illustrated embodiment is so formed as to protrude rearward from an upper region (a left upper region) 81d of the left side region 81c of the left rear panel 81. That is, the left upper region 81d of the left side region 81c of the left rear panel 81 concurrently acts as the front wall 54a of the oblique-collision arresting section 54. The front wall 54a is provided with a plurality of communication holes 66 through which an inflation gas G flows into the oblique-collision arresting section 54. Further, the oblique-collision arresting section 54 internally includes a tether 67 for regulating a clearance between the periphery of the communication holes 66 of the front wall 54a and the right wall 54d forming the oblique-collision arresting plane 55 and a tether 68 for regulating a clearance between the upper wall 54e and lower wall 54f of the oblique-collision arresting section 54.

In the area from the oblique-collision arresting section 54 to the front end 51a (support plane 52) of the support inflatable region 51, the auxiliary bag section 50 is partitioned into a high-pressure section 57 and a low-pressure section 58 by a partition wall 59. The high-pressure section 57 has a high internal pressure at airbag deployment while the low-pressure section 58 has a low internal pressure at airbag deployment. When viewing the airbag 31 as fully deployed from above, the partition wall 59 extends diagonally forward towards the driver's seat 13 from the rear end 59b located at a vicinity of the border 47 of the front-collision arresting plane 40 and oblique-collision arresting plane 55. The front end 59a of the partition wall 59 is located proximate the front end 51a (or on the support plane 52) of the auxiliary bag section 50. In the illustrated embodiment, the front end 59a of the partition wall 59 is located at the intersecting region 53 of the front end 51a of the auxiliary bag section 50 and the lateral 50c facing towards the driver's seat 13.

Figure 9A:
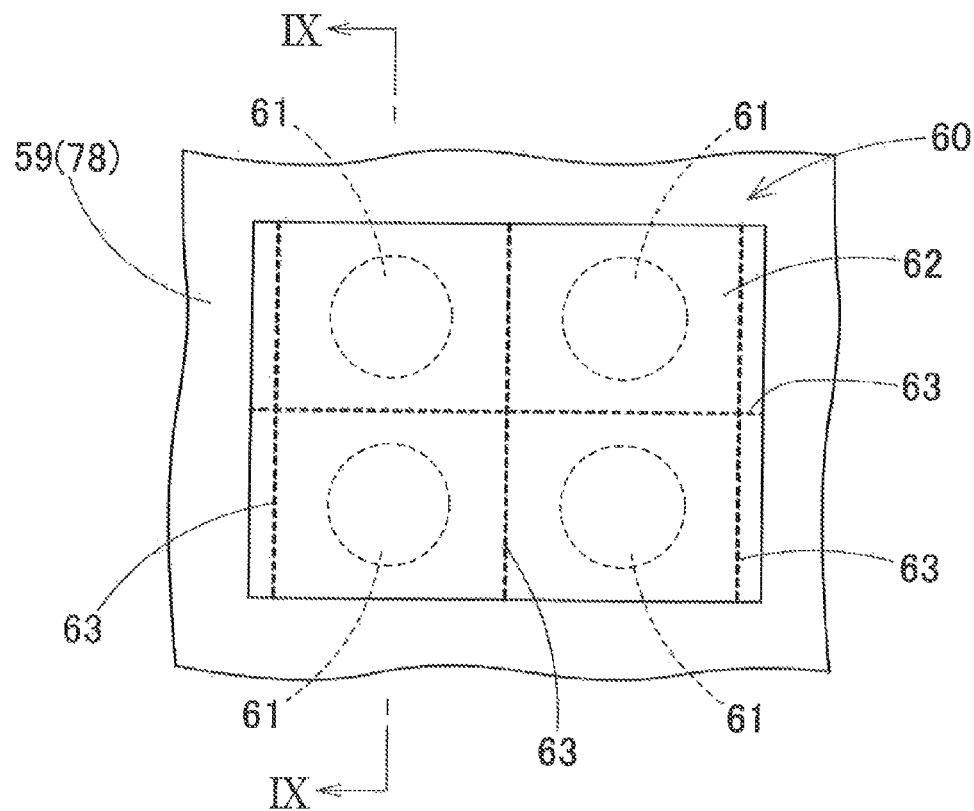
FIG. 9A is a front elevation of a check valve formed on a partition wall of the airbag of the first embodiment.
Figure 9B:
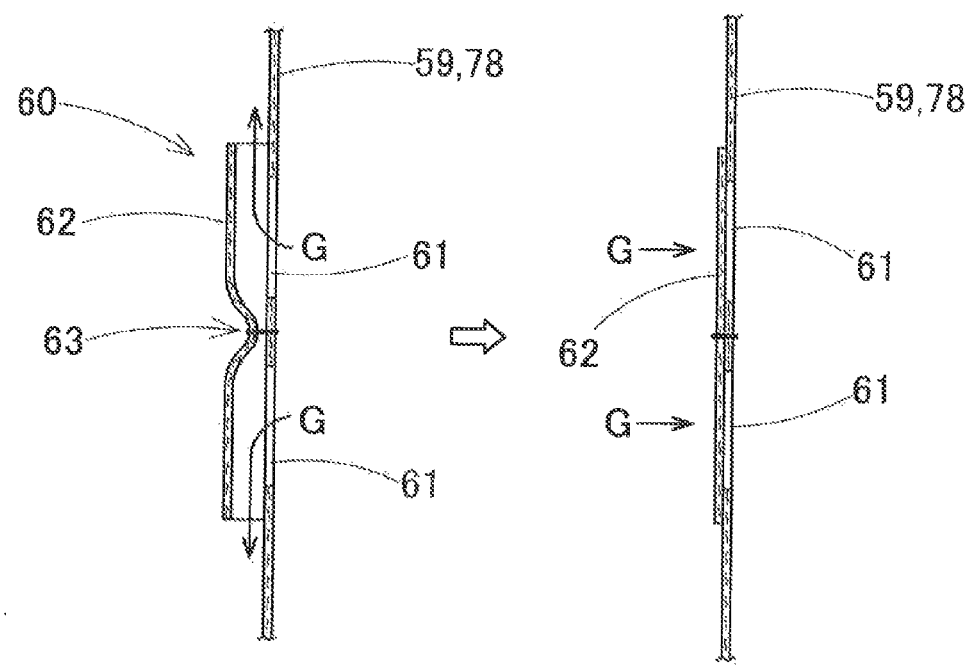
FIG. 9B depicts the behavior of the check valve of FIG. 9A in service by sectional views taken along line IX-IX of FIG. 9A.

The high-pressure section 57 includes a check valve 60 acting as an inflation gas supply mechanism that allows an inflation gas G to flow into the high-pressure section 57 from the low-pressure section 58 and prevents the gas G from flowing into the low-pressure section 58 from the high-pressure section 57. In the illustrated embodiment, the inflation gas supply mechanism or check valve 60 is composed of a plurality of (four, in the illustrated embodiment) communication holes 61 formed on the partition wall 59 in such a manner as to lie side by side and one above the other in an approximate fashion, and a sheet-shaped flap valve 62 jointed to the periphery of the communication holes 61 on a side of the high-pressure section 57. The flap valve 62 is formed of a flexible airbag fabric of polyimide, polyester or the like for forming the airbag 31, in a similar fashion to the partition wall 59, rear panel 81 or the like, and is jointed to the partition wall 59 by a joint (or sewn portion) 63 that sews the flap valve 62 to the partition wall 59 vertically by the front and rear edges in the periphery of the communication holes 61 and in the shape of a cross in between the communication holes 61. As shown in FIG. 9B, an inflation gas G in the low-pressure section 58 pushes the flap valve 62 and flows into the high-pressure section 57, and when an internal pressure of the high-pressure section 57 is increased, the flap valve 62 is pressed against the periphery of the communication holes 61 and closes off the communication holes 61, thus preventing the gas G from flowing back to the low-pressure section 58 and keeping the internal pressure of the high-pressure section 57 higher than that of the low-pressure section 58.

The low-pressure section 58 of the auxiliary bag section 50 is in gas communication with the main bag section 33 and the main bag section 33 is provided with a vent hole 43. Therefore, when the inflators 93 and 93A are actuated and discharge an inflation gas G and inflate the airbag 31, the low-pressure section 58 will lose pressure thereafter due to the outflow of inflation gas G out of the vent hole 43. In contrast, the high-pressure section 58 does not include a vent hole and does not let the gas G go to the low-pressure section 58, and therefore will keep a higher pressure than the low-pressure section 58.

Figure 2:
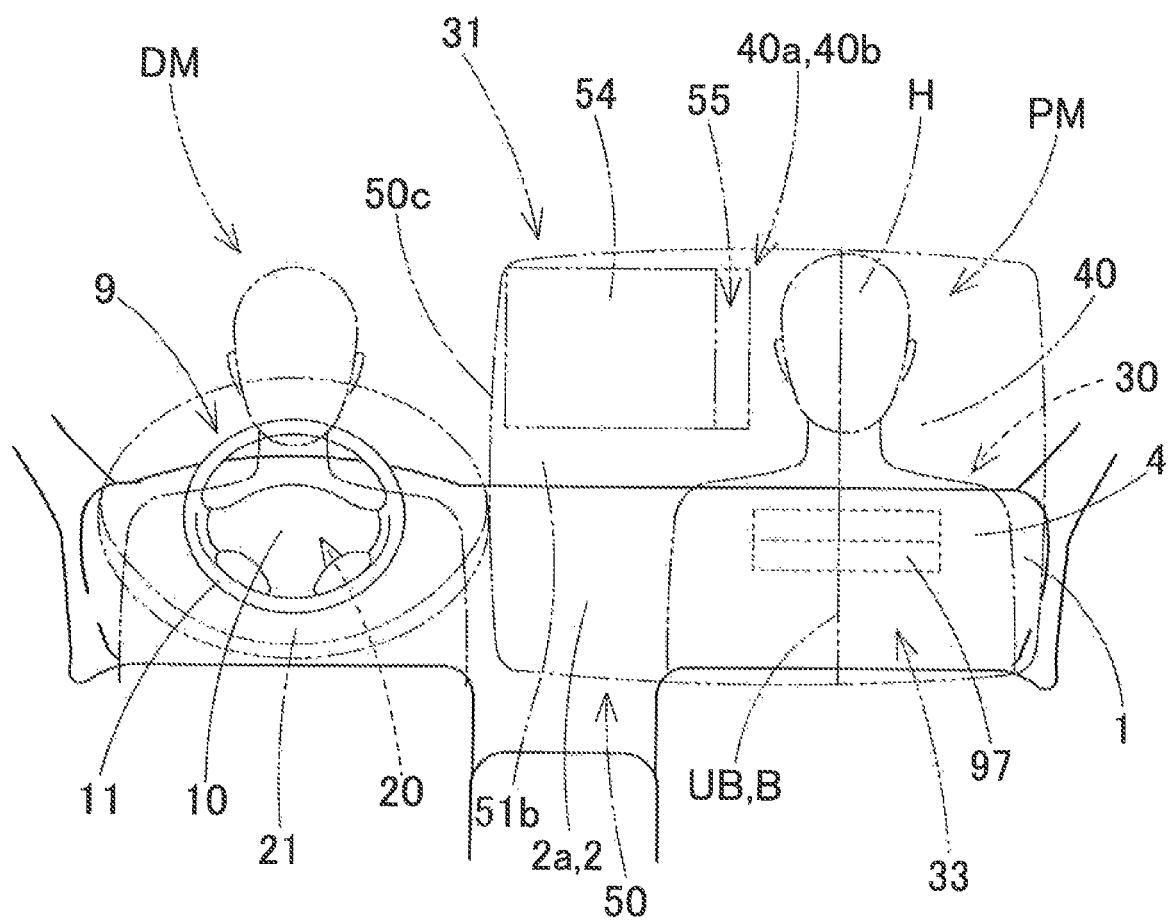
FIG. 2 is a schematic front elevation of the airbag device of the first embodiment.
Figure 4:
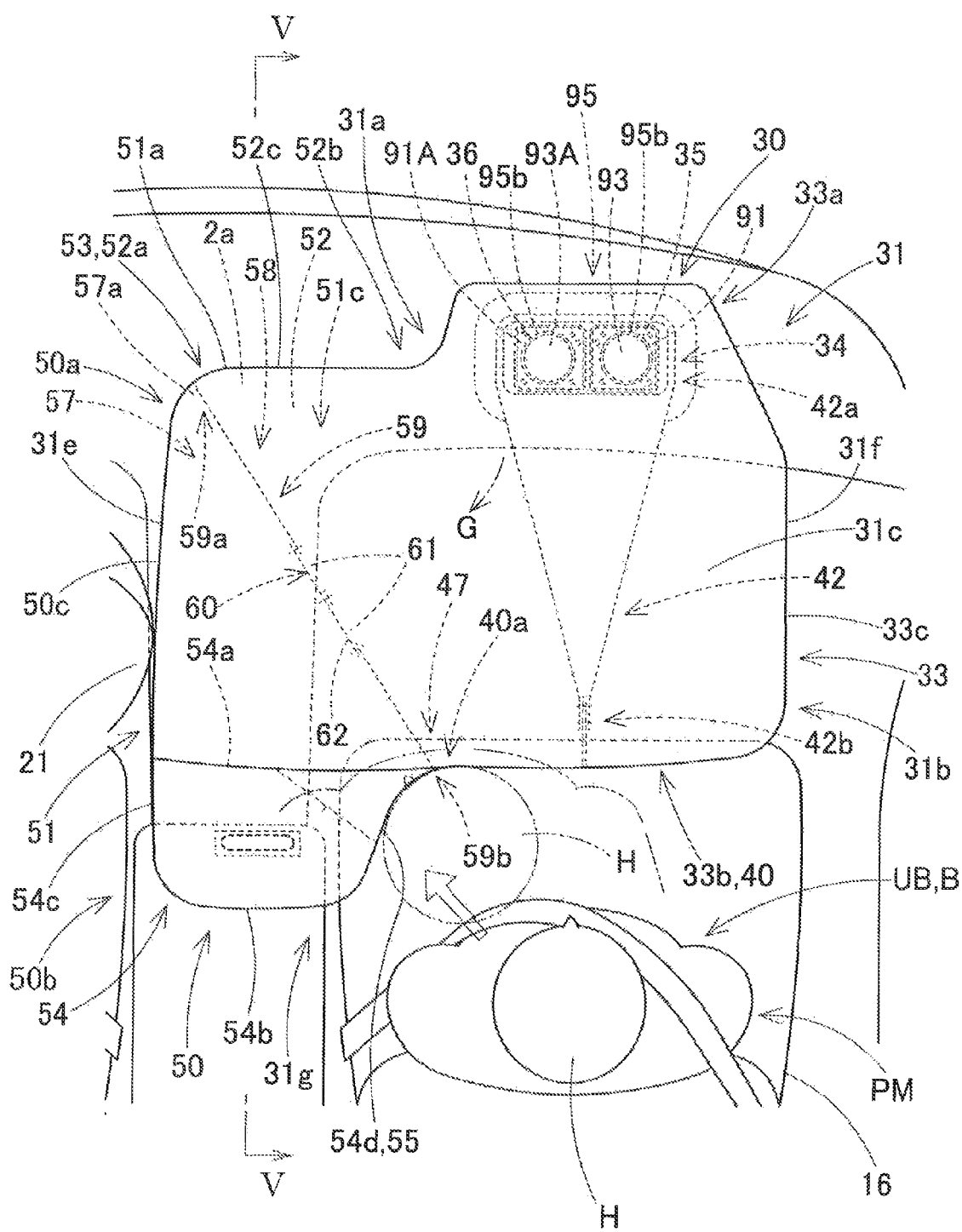
FIG. 4 is a schematic plan view of the airbag device of the first embodiment in service.

Further, as shown in FIGS. 1, 2 and 4, the airbag 31 at deployment is designed to contact an airbag 21 of an airbag device 20 for a driver's seat as deployed by the lateral 50c of the auxiliary bag section 50 facing towards the driver's seat 13. The airbag device 20 for a driver's seat is mounted on a boss 10 disposed at the center of a steering wheel 9 of a steering device 8. The steering wheel 9 is located in front of the driver's seat 13 and serves for steering of the vehicle V by being rotated in a predetermined direction.

The airbag 21 for a driver's seat is stored in the boss 10 of the steering wheel 9 in a folded-up configuration so as to be inflatable with an inflation gas fed from a not-shown inflator and deployable rearward for catching a driver DM moving forward.

The airbag 21 is inflatable into a generally disc-like shape having a greater outer dimension than a rim 11 of the steering wheel 9. The airbag 21 is supported by the rim 11 at the front surface at deployment. As described above, the airbag 21 is designed to contact the lateral 50c of the auxiliary bag section 50 as deployed at deployment, in other words, the airbag 21 supports the lateral 50c of the auxiliary bag section 50 of the airbag 31.

Figure 10:
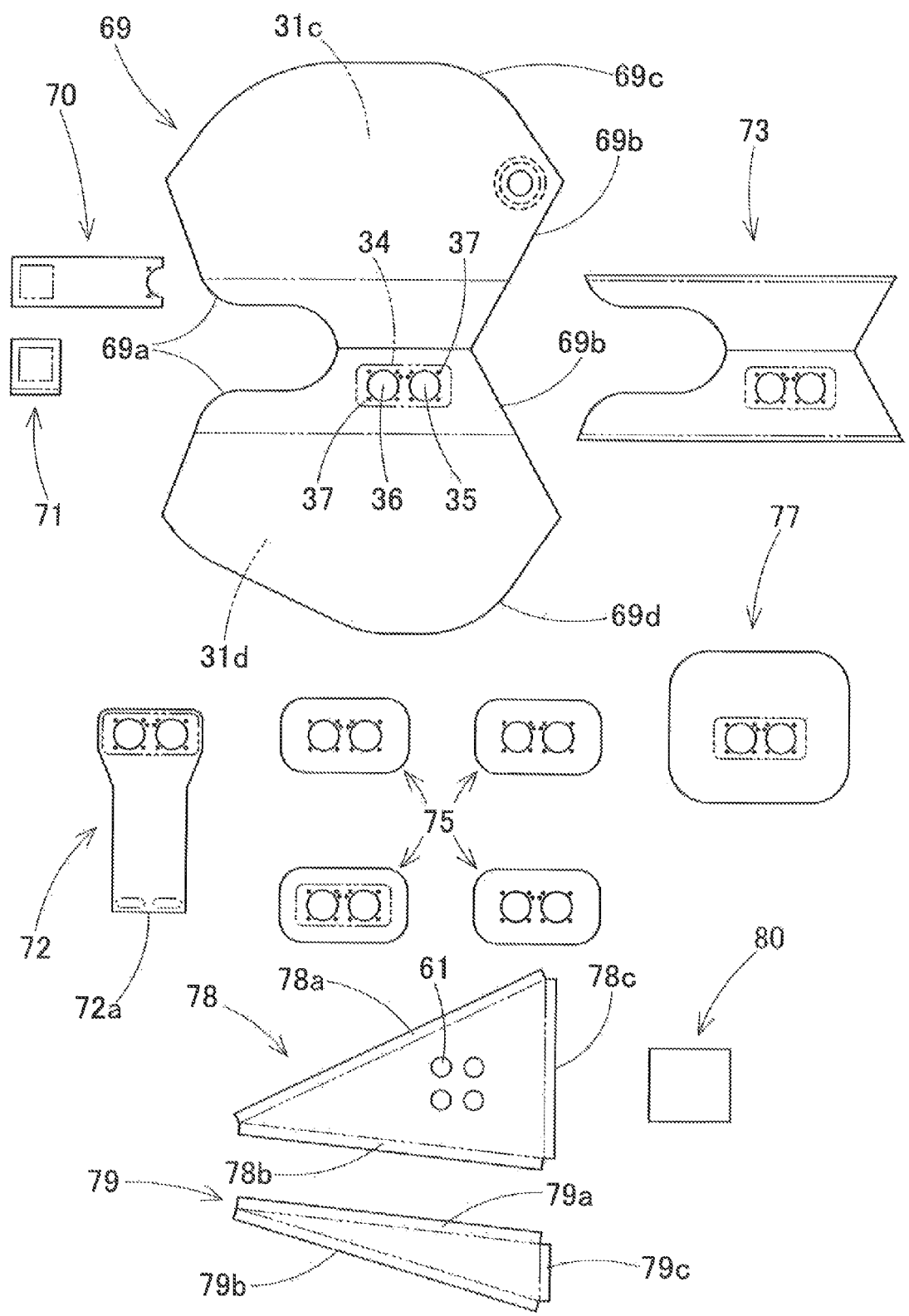
FIGS. 10 and 11 depict components of the airbag of the first embodiment.
Figure 11:
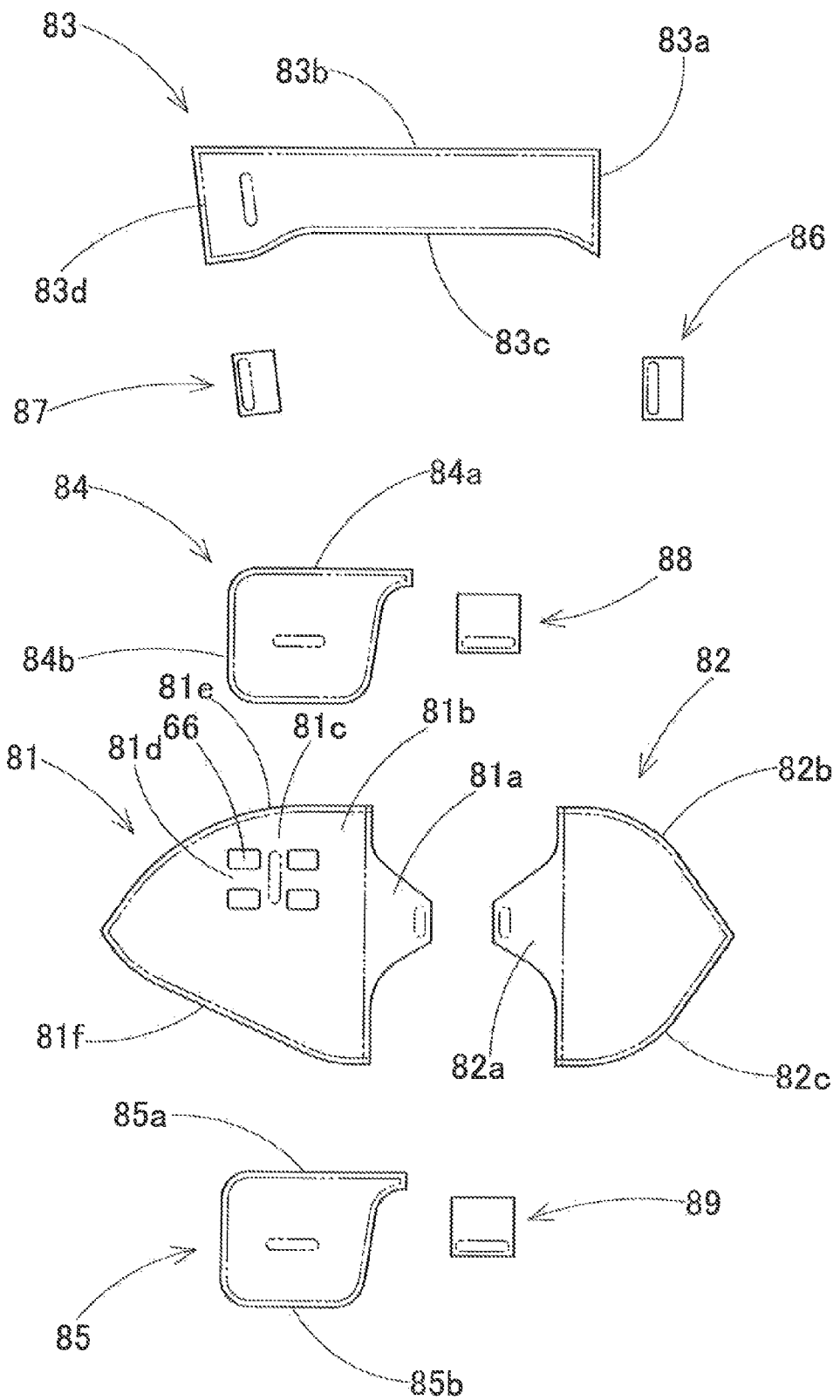

Components of the airbag 31 for a front passenger seat are now described. As shown in FIGS. 10 and 11, the components include, as members for forming a shell of the airbag 31, a front panel 69, rear panels 81 and 82, an obverse panel 83, an upper panel 84, and a lower panel 85. The components further include, as members to be disposed inside the airbag 31, a tether cloth 72 for forming the vertical tether, reinforcing cloths 73, 74, 75 and 76, a mist patch 77, cloths 78 and 79 for forming the partition wall, a cloth 80 for forming the flap valve and tether cloths 86, 87, 88, 89 for forming tethers. In addition, the components include tether cloths 70 and 71 for forming the outer tether as members to be disposed outside of the airbag 31. The components are formed of woven fabric of polyamide, polyester or the like.

The front panel 69 constitutes the upper wall 31c, lower wall 31d of the airbag 31, a part of the left wall 31e and a part of the right wall 31f in the front region 50a of the airbag 31. As describe above, the rear panel 81 constitutes the left side region of the front-collision arresting plane 40 in the rear surface 33b of the airbag 31 (main bag section 33), the rear surface 51b of the support inflatable region 51 of the auxiliary bag section 50, the front wall 54a of the oblique-collision arresting section 54 and a part of the left wall 31e at the rear region 50b of the airbag 31. The rear panel 82 constitutes the right side region of the front-collision arresting plane 40 in the rear surface 33b of the airbag 31 and a part of the right wall 31f at the rear region 50b of the airbag 31. The obverse panel 83 forms the left wall 54c, rear wall 54b and right wall 54d of the oblique-collision arresting section 54. The oblique-collision arresting plane 55 is formed on the right wall 54d. The upper panel 84 forms the upper wall 54e of the oblique-collision arresting section 54 while the lower panel 85 forms the lower wall 54l.

The tether cloths 70 and 71 forms the outer tether 45. The tether cloth 70 is held by the bolts 91a disposed on the left side of the retainer 91A, the tether cloth 71 is connected to the front end 51a of the support inflatable region 51 of the auxiliary bag section 50, and the tether cloths 70 and 71 are jointed together to form the outer tether 45. The tether cloth 72 forms the vertical tether 42. The reinforcing cloths 73, 75 and mist patch 77 reinforce and enhance heat resistance of the mounting section 34 of the main bag section 33. The cloths 78 and 79 are sewn together one above the other for forming the partition wall 59. The cloth 80 forms the flap valve 62 jointed to the periphery of the communication holes 61 formed on the cloth 78. The tether cloths 86 and 87 form the tether 67 disposed transversely inside the oblique-collision arresting section 54. The tether cloth 86 is jointed to the rear panel 81 while the tether cloth 87 is jointed to the right wall 54d, and the cloths 86 and 87 are jointed together. The tether cloths 88 and 89 forms the tether 68 arranged vertically inside the oblique-collision arresting section 54. The tether cloth 88 is jointed to the upper wall 54e while the cloth 89 is jointed to the lower wall 54f, and the cloths 88 and 89 are jointed together.

To describe the manufacturing of the airbag 31 using these components in a schematic fashion, the airbag 31 is manufactured by sewing and reversing from the inlet port 35 so as to let as less seam allowances as possible out of the airbag 31. Firstly, on the part of the front panel 69, opposite edges in an up and down direction of the reinforcing cloth 73 are sewn to the vicinity of the border between the upper wall 31c and lower wall 31d, and the upper edge 78a of the cloth 78 for forming the partition wall is sewn to the upper wall 31c while the lower edge 79b of the cloth 79 for forming the partition wall is sewn to the lower wall 31d. The cloth 78 is provided with the communication holes 61 beforehand, and the flap valve 62 is also sewn thereto in advance. Thus the cloth 78 is preliminarily provided with the check valve 60. Thereafter, the tether cloth 72, the reinforcing cloths 75, and the mist patch 77 are sewn to the location of the mounting section 34 of the front panel 69 in layers, and the inlet ports 35 and 36 are punched out there. The front panel 69 is provided with the vent hole 43 beforehand. Then the front panel 69 is doubled such that the outer surfaces of the upper wall 31c and lower wall 31d face each other, and then the left edges 69a and right edges 69b of the upper wall 31c and lower wall 31d in the front region of the airbag 31 are sewn together.

On the part of the rear panel 81, the tether cloth 86 is sewn to the left upper region 81d, which is provided with the communication holes 66 beforehand. The tether cloth 88 is sewn to the upper panel 84 beforehand, while the tether cloth 89 is sewn to the lower panel 85 and the tether cloth 87 is sewn to the obverse panel 83. Front edges 84a and 85a of the upper panel 84 and lower panel 85 and left edge 83a of the obverse panel 83 are sewn to predetermined positions of the left upper region 81d of the rear panel 81. Then the upper edge 83b of the obverse panel 83 and the rear edge 84b of the upper panel 84 are sewn together while the lower edge 83c of the obverse panel 83 and the rear edge 85b of the lower panel 85 are sewn together. Subsequently, the tether cloths 86 and 87, and the tether cloth 88 and 89 are sewn together, respectively, to form the tethers 67 and 68. Then the right edge 83d of the obverse panel 83 is sewn to a predetermined position of the left upper region 81d of the rear panel 81. The rear panels 81 and 82 are joined together vertically by the regions proximate the tongue sections 81a and 82a.

Thereafter, the front panel 69 is turned inside out such that the outer surface faces outwardly, and is opened in a flat fashion in such a manner as to pull the upper edge 69c away from the lower edge 69d. The rear panels 81 and 82 are overlaid over there in such a manner as to mate the upper edges 81e and 82b of the rear panels 81 and 82 and the upper edge 69c of the front panel 69, and mate the lower edges 81f and 82c of the rear panels 81 and 82 and the lower edge 69d of the front panel 69, and the corresponding outer edges are sewn together. Subsequently, rear edges 78c and 79c of the cloths 78 and 79 for forming the partition wall are sewn to the rear panel 81 and then the lower edge 78b of the cloth 78 and upper edge 79a of the cloth 79 are sewn together to form the partition wall 59.

Thereafter, the airbag 31 is turned inside out with the aid of the inlet port 35 and the tether cloth 72 is taken out of the inlet port 35. The tether cloth 72 is doubled at the rear region 72a and the doubled rear region 72a and the tongue sections 81a and 82a of the rear panels 81 and 82, which are placed back to back, are sewn together to form the vertical tether 42. Then the vertical tether 42 is put back into the airbag 31 via the inlet port 35.

Then the tether cloth 70 is sewn to the periphery of the inlet port 36 and the tether cloth 71 is sewn to the tether cloth 70, thus forming the outer tether 45. Manufacturing of the airbag 31 is thus completed.

Mounting of the airbag device 30 for a front passenger seat on a vehicle V is now described. Firstly, the retainers 91 and 91A are housed inside the airbag 31 such that the bolts 91a protrude out of the mounting holes 37, and the airbag 31 is folded up. Then the airbag 31 is placed on the bottom wall 95a of the case 95 so as to be stored inside the case 95, such that the bolts 91a of the retainers 91 and 91A protrude out of the mounting holes (reference numeral omitted) formed in the peripheries of the openings 95b of the bottom wall 95a. Then the main bodies 93a of the inflators 93 and 93A are set in the case 95 from below such that the bolts 91a penetrate the flanges 93c of the inflators 93 and 93A. If then nuts 92 are used to fasten the bolts 91a, the airbag 31 and the inflators 93 and 93A are mounted on the bottom wall 95a of the case 95.

Thereafter, the case 95 is jointed to the bracket extending from the dashboard reinforcement of the vehicle V with the aid of the not-shown mounting members, and the inflators 93 and 93A are connected to lead wires extending from a not-shown control device for actuating the airbag device 30. Then if the dashboard 1 is mounted on the vehicle V, the airbag device 30 is mounted on the vehicle V.

In the meantime, the inflator of the airbag device 20 for a driver's seat is also connected to lead wires extending from the control device. The airbag device 20 is mounted on the steering wheel 9, and mounted on the vehicle V by mounting the steering wheel 9 on the steering device 8. If the airbag device 20 for a driver' seat and the airbag device 30 for a front passenger seat are mounted on the vehicle V, a protection device FAB for occupants in front-row seats is mounted on the vehicle V, including the airbag devices 20 and 30.

Figure 5:
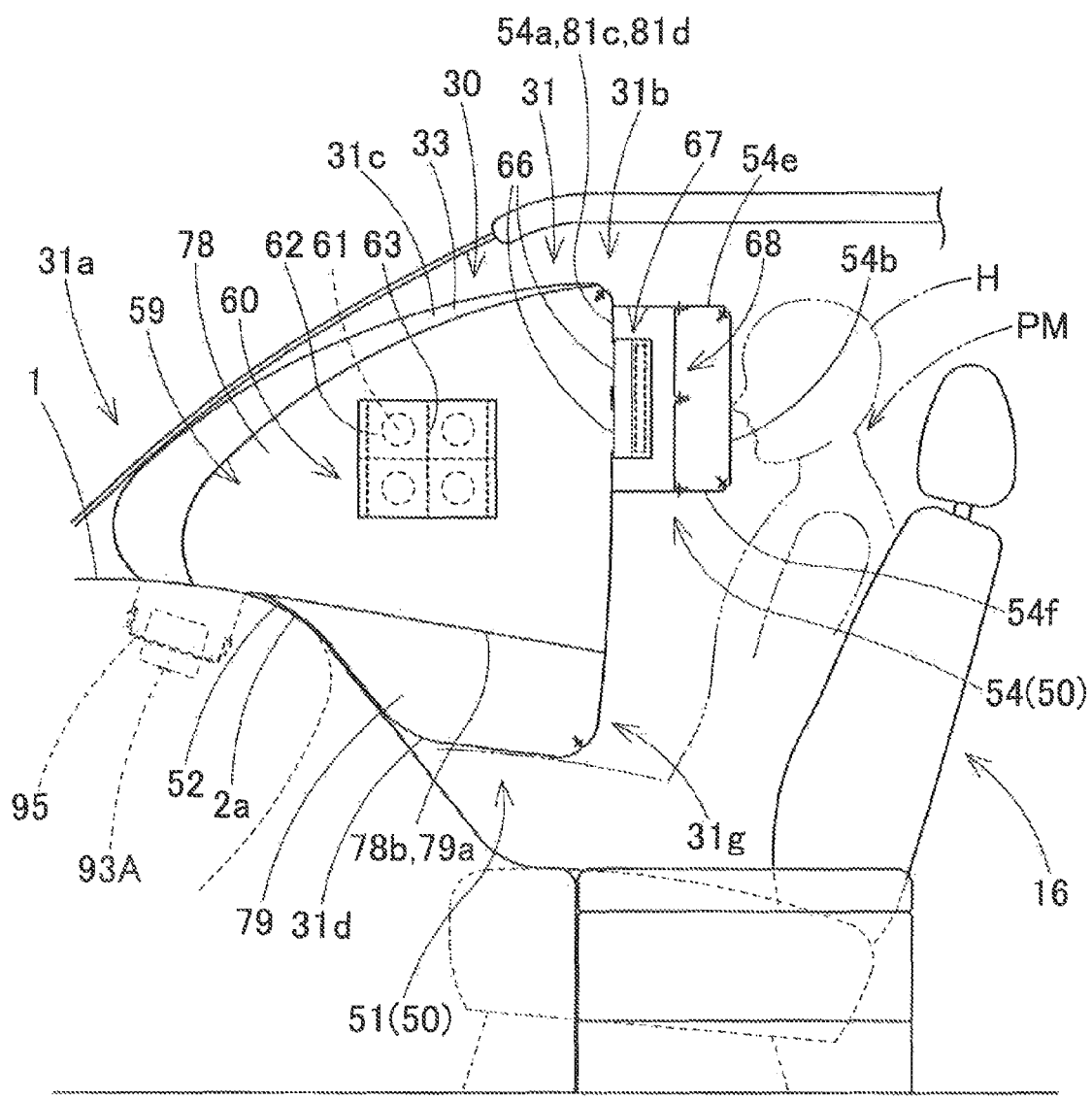
FIG. 5 is a schematic vertical section of the airbag device of the first embodiment in service, taken along line V-V of FIG. 4.

After the airbag device 30 for a front passenger seat of the first embodiment is mounted on the vehicle V, if the inflators 93 and 93A are fed with an actuating signal, the airbag 31 pushes and opens the doors 97a and 97b of the airbag cover 97, protrudes out of the case 95, and is deployed rearward as indicated by double-dotted lines in FIGS. 1 and 2 and as shown in FIGS. 4, 5 and 8. At the same time, the airbag device 20 for a driver's seat is also actuated and the airbag 21 is deployed rearward from the boss 10 serving as the housing.

When the airbag 31 completes deployment, the oblique-collision arresting section 54 (or high-pressure section 57) of the auxiliary bag section 50 protrudes rearward at the rear region 31b of the airbag 31, specifically, at a position facing towards the driver's seat 13 in the upper region 40b of the front-collision arresting plane 40. With this configuration, as indicated by double-dotted lines in FIG. 4, the oblique-collision arresting plane 55 of the oblique-collision arresting section 54 will catch the head H of the passenger PM moving diagonally forward and toward the driver's seat 13 in the event of an oblique collision of the vehicle V. Since the oblique-collision arresting section 54 is the high-pressure section 57 having high internal pressure, the oblique-collision arresting section 54 will not likely to fall down (or dent) and let the head H of the passenger PM turn along therewith. Therefore, the oblique-collision arresting section 54 will be able to catch and protect the head H of the passenger PM in an adequate fashion without turning the head H.

Assuming that the airbag 31 has no oblique-collision arresting section 54 and is so configured that the front-collision arresting plane 40 is simply extended farther to the left, if the head H of the passenger PM moves diagonally forward and towards the driver's seat, the head H will contact the extended region of the front-collision arresting plane 40 and turns clockwise as viewed from above in such a manner as to face toward an outboard direction away from the driver's seat 13. In contrast, if the oblique-collision arresting plane 55 of the oblique-collision arresting section 54 is so formed as to be continuous with the edge 40a of the front-collision arresting plane 40 on a side of the driver's seat 13 in an arc-face fashion and extend rearward like the illustrated embodiment, the oblique-collision arresting plane 55 will catch the head H with its wide surface and prevent the head H from turning. Moreover, since the oblique-collision arresting section 54 is the high-pressure section 57 and does not easily fall down, the oblique-collision arresting plane 55 will catch the head H in a further steady fashion without turning the head H.

In the event of a frontal collision of the vehicle V, the front-collision arresting plane 40 of the main bag section 33 will catch the upper body UB of the passenger PM moving forward. The main bag section 33 has an equal internal pressure to the low-pressure section 58 which is lower in internal pressure than the high-pressure section 57. Further, the low-pressure section 58 is located also in the area in front of the high-pressure oblique-collision arresting section 54, i.e., in a right half oblique area 51c, as viewed from above, of the support inflatable region 51. Therefore, the front-collision arresting plane 40 will be able to cushion the passenger PM moving forward without being affected by the rigidity (shape retention property) of the oblique-collision arresting section 54.

If, hypothetically, the high-pressure oblique-collision arresting section 54 is disposed up to the front end 51a of the auxiliary bag section 50 with the same width in a left and right direction, instead of setting the low-pressure section 58 there, the rigidity of the airbag 31 at deployment will be enhanced due to the oblique-collision arresting section 54. With such a configuration, when the front-collision arresting plane 40 catches head on the passenger PM moving forward and moves forward after that, the region of the front-collision arresting plane 40 disposed towards the oblique-collision arresting section 54 would not dent, and the front-collision arresting plane 40 would slant in such a manner as to face towards an outboard direction with its edge facing away from the driver's seat 13, i.e., the right edge 40c, moved forward while its edge 40a facing towards the driver's seat 13 staying at the rear. As a result, the front-collision arresting plane 40 would fail to arrest the passenger PM and let him slip towards an outboard direction, and therefore would not be likely to protect the passenger PM adequately.

Therefore, with the airbag device 30 for a front passenger seat according to the first embodiment of the invention, the airbag 31 will be able to catch the passenger PM (especially his head H) adequately in the event of an oblique collision of the vehicle V as well as cushion the passenger PM smoothly in the event of a frontal collision of the vehicle V.

The high-pressure section 57 desirably has an internal pressure two to three times higher than the low-pressure section 58 when the airbag 31 is fully inflated and catches the passenger PM. In particular, it is desired that the internal pressure of the high-pressure section 57 is 20 to 45 kPa and that of the low-pressure section 58 is 10 to 15 kPa.

In the first embodiment, the inflators 93 and 93A are disposed in the case (housing) 95 for feeding an inflation gas G to the airbag 31 and the main bag section 33 of the airbag 31 is so inflatable as to extend rearward from the case 95. Further, the high-pressure section 57 includes in the partition wall 59 a check valve 60 acting as the inflation gas supply mechanism, and the check valve 60 allows the inflation gas G to flow into the high-pressure section 57 from the low-pressure section 58 and prevents the gas from flowing into the low-pressure section 58 from the high-pressure section 57.

With this configuration, as shown in FIG. 9B, once the inflation gases G emitted from the inflators 93 and 93A have flown into the high-pressure section 57 from the main bag section 33 via the low-pressure section 58, the flap valve 62 of the check valve 60 in the partition wall 59 is pushed by the pressure of the high-pressure section 57 and closes off the communication holes 61, therefore the gas G inside the high-pressure section 57 cannot flow back into the low-pressure section 58, such that the high-pressure section 57 is able to maintain a higher pressure than the low-pressure section 58 in a steady fashion. The low-pressure section 58 and high-pressure section 57 are merely partitioned by the partition wall 59 provided with the check valve 60, and the low-pressure section 58 and high-pressure section 57 share the inflators 93 and 93A, which does not complicate the configuration of the airbag device 30.

The configuration of the check valve should not be limited to that of the foregoing embodiment. The check valve has only to have such a flexibility as to be foldable together with the airbag 31. By way of example, the check valve may be comprised of a tapering feed path formed of an airbag fabric and arranged to extend from an insert hole of the low-pressure section to the high-pressure section. Such a feed path will allow an inflation gas to flow into the high-pressure section from the low-pressure section since the feed path is open, but will be bent when the gas is going to flow back into the low-pressure section from the high-pressure section, thus shutting off a backflow of the gas. Other various configurations may be adopted as well.

If the high-pressure section 57 is likely to be too high in internal pressure, it may be provided with a small vent hole at its region facing towards a vehicle interior, or a return channel for letting the gas G back to the low-pressure section 58 from the high-pressure section 57, in order to suppress an elevation of internal pressure.

In the airbag device 30 of the first embodiment, moreover, the auxiliary bag section 50 includes at the front end 51a at deployment the support plane 52 that is supported by the rear surface 2a of the center cluster 2 of the dashboard 1 at airbag deployment.

With this configuration, when fully deployed, the auxiliary bag section 50 will not be likely to move forward since the support plane 52 is supported by the rear surface 2a of the dashboard 1. Therefore the oblique-collision arresting section 54 will not easily move forward and be able to arrest the head H of the passenger PM without turning the head H.

Furthermore, as shown in FIG. 8, when viewing the airbag 31 as fully deployed from above, the partition wall 59 of the airbag 31 extends diagonally forward towards the driver's seat 13 from the rear end 59b located at a vicinity of the border 47 between the front-collision arresting plane 40 and oblique-collision arresting plane 55. The front end 59a of the partition wall 59 is located in the front end region 51a of the auxiliary bag section 50 not beyond the intersecting region 53 of the front end 51a of the auxiliary bag section 50 and the lateral 50c facing towards the driver's seat 13.

That is, the partition wall 59 partitions the low-pressure section 58 from the high-pressure section 57 including the oblique-collision arresting section 54, and the partition wall 59 extends diagonally forward towards the driver's seat 13 from the vicinity of the border 47 between the front-collision arresting plane 40 and oblique-collision arresting plane 55 in the rear surface of the airbag 31 up to the front end region 51a (up to the support plane 52) of the auxiliary bag section 50. With this configuration, the front end region 57a of the high-pressure section 57 is located in the support plane 52 which is to be supported by the rear surface 2a of the dashboard 1 at airbag deployment, such that the high-pressure section 57 will be able to secure a reaction force for counteracting a diagonally forward direction directly from the dashboard 1, thus catching the head H of the passenger PM moving diagonally forward in the event of an oblique collision in a further steady fashion. Moreover, since the high-pressure section 57 is arranged over an entire area in a front and rear direction of the lateral 50c of the auxiliary bag section 50 facing towards the driver's seat 13, the high-pressure section 57 including the oblique-collision arresting section 54 may also be supported by the airbag 21 for the driver's seat 13 and/or steering wheel 9 at airbag deployment. If supported by the airbag 21 for the driver's seat 13 and/or steering wheel 9, the oblique-collision arresting section 54 will be able to catch the head H of the passenger PM moving diagonally forward further without oscillating toward the driver's seat 13.

Although including the high-pressure section 57, there will be no fear of impair in performance of the airbag 31 of catching the passenger in the event of a frontal collision, because the auxiliary bag section 50 includes in the area 51c in front of the partition wall 59 the low-pressure section 58 having gas communication with the main bag section 33.

The front end 59a of the partition wall 59 may be disposed at the center 52c in a left and right direction of or at the right end 52b of the front end region 51a (the support plane 52) of the auxiliary bag section 50, provided that the low-pressure section 58 is disposed in the front region 50a of the auxiliary bag section 50. However, in view of the influence of the rigidity of the high-pressure section 57 on cushioning the passenger PM in the event of a frontal collision, the front end 59a of the partition wall 59 is desirably located proximate to the left end 52a of the support plane 52.

In the foregoing embodiment, especially, the front end 59a of the partition wall 59 is located at the left end 52a of the support plane 52, in other words, at the intersecting region 53 of the front end 51a and the lateral 50c of the auxiliary bag section 50 such that the partition wall 59 extends in a direction that the head H of the passenger PM moves at an oblique collision. This configuration will help secure a direct support of the front end 57a of the high-pressure section 57 by the dashboard 1 as well as a wide area 51c of the low-pressure section 58.

The partition wall 59 may also be so configured, when viewing the airbag 31 as fully deployed from above, as to extend diagonally forward towards the driver's seat 13 from the rear end 59b located at the vicinity of the border 47 between the front-collision arresting plane 40 and oblique-collision arresting plane 55 to a front end 59a which is located at the lateral 50c of the auxiliary bag section 50 facing towards the driver's seat 13 and deployable farther forward relative to the airbag 21 for a driver's seat as deployed, i.e., farther forward relative to the steering wheel 9, like a partition wall 59A indicated by double-dotted lines in FIG. 8.

With this configuration, the high-pressure section 57 including the oblique-collision arresting section 54 will be supported by the airbag 21 for the driver's seat 13 and/or steering wheel 9 at airbag deployment, as described above, and the oblique-collision arresting section 54 will be able to catch the head H of the passenger PM moving diagonally forward without oscillating toward the driver's seat 13.

The front end of the partition wall extending diagonally forward from the rear end may also be located at a position deployable at the rear of the steering wheel 9 on the lateral 50c.

Figure 12:
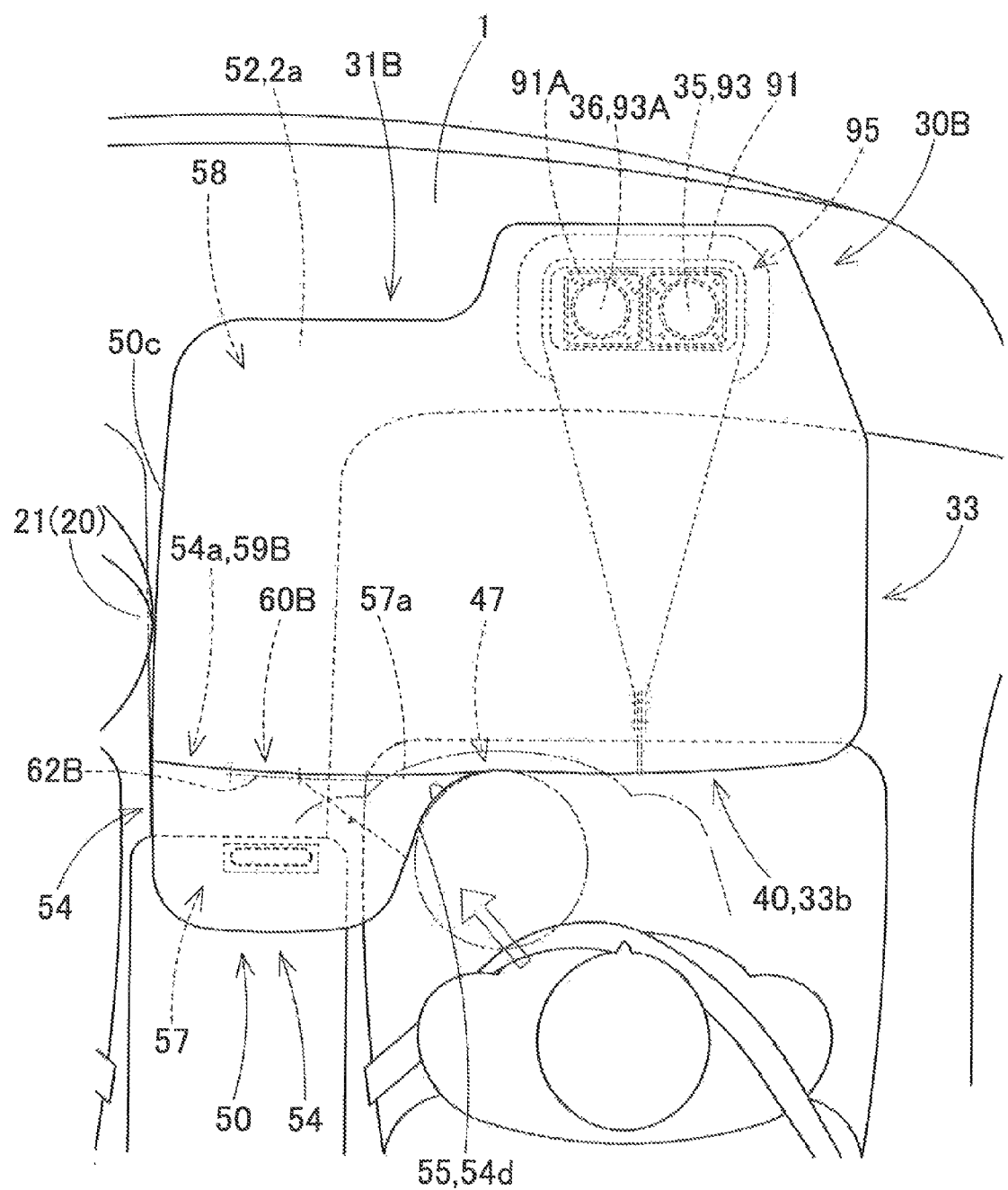
FIG. 12 is a schematic plan view of an airbag device for a front passenger seat according to the second embodiment in service.
Figure 13:
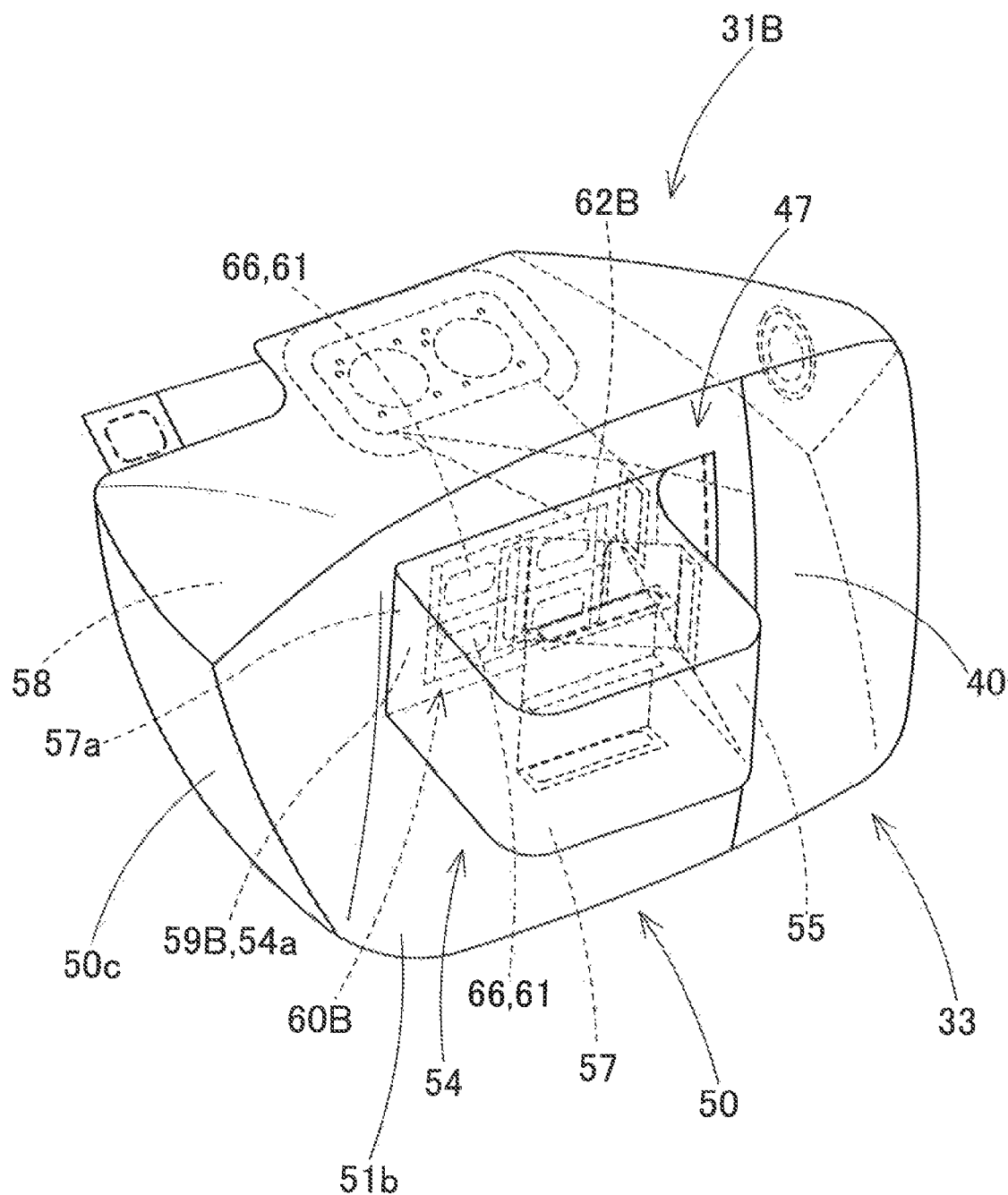
FIG. 13 is a schematic perspective view of an airbag of the second embodiment as fully inflated.
Figure 14:
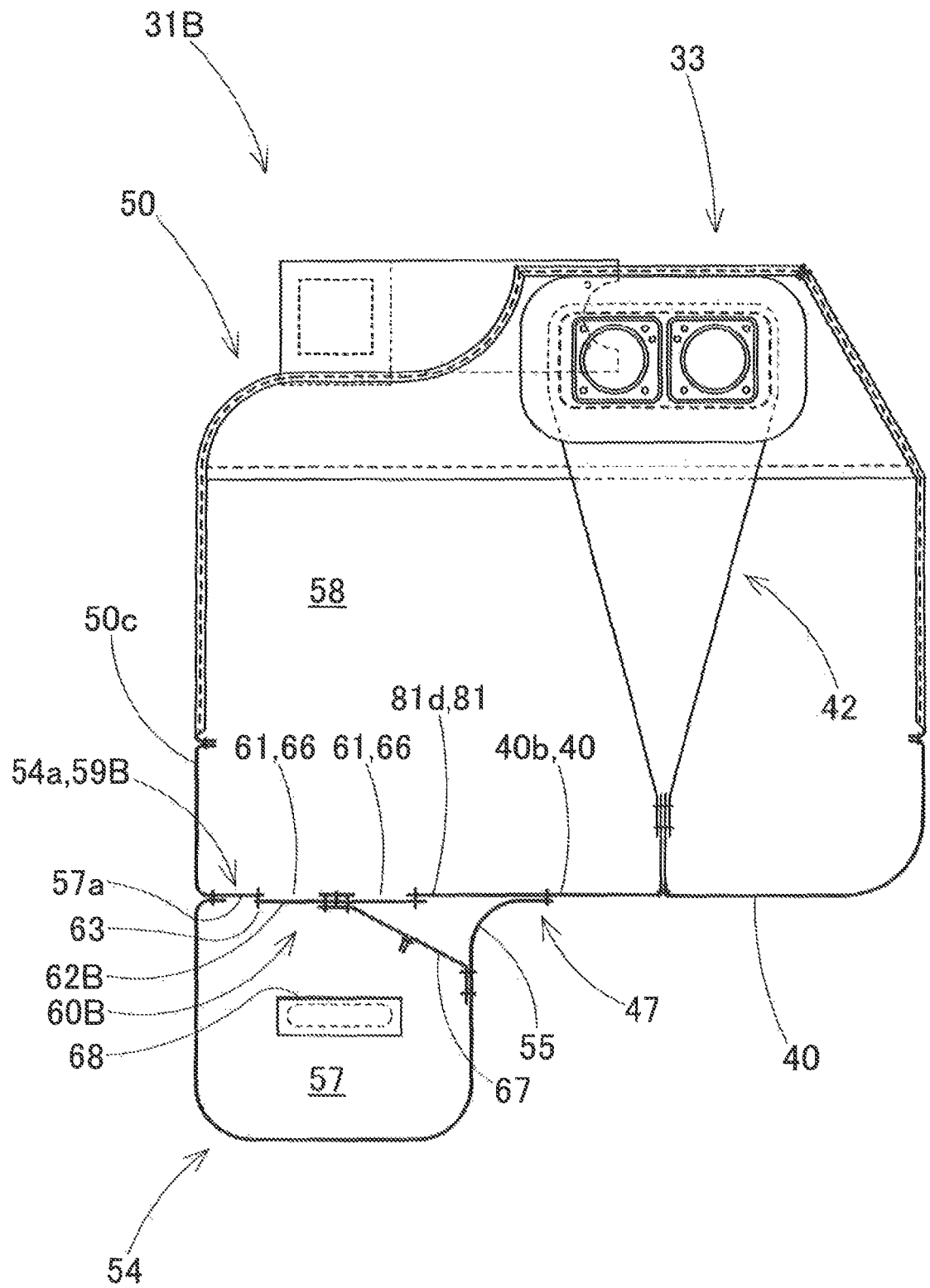
FIG. 14 is a schematic horizontal sectional view of the airbag of the second embodiment as fully inflated.

Furthermore, like an airbag 31B for an airbag device 30B for a driver's seat according to the second embodiment shown in FIGS. 12 to 14, the partition wall 59B may also be so configured, when viewing the airbag 31B as fully deployed from above, as to extend from the border 47 between the front-collision arresting plane 40 and oblique-collision arresting plane 55 in such a manner as to elongate the front-collision arresting plane 40, and be connected to the lateral 50c of the auxiliary bag section 50 facing towards the driver's seat 13.

With this configuration, although the front end 57a of the high-pressure section 57 is not directly supported by the dashboard 1, steering wheel 9 or the like, the oblique-collision arresting section 54 acting as the high-pressure section 57 will be able to gain a reaction force from the dashboard 1 through the medium of the low-pressure section 58 and from the steering wheel 9 with the aid of the airbag 21, and catch the head H of the passenger PM moving diagonally forward without oscillating in the event of an oblique collision.

In the airbag 31B, the front wall 54a of the oblique-collision arresting section 54 constitutes the partition wall 59B, and the check valve 60B is configured as in the first embodiment. That is, a flap valve 62B is jointed to the partition wall 59B (front wall 54a) by a joint 63 that sews the flap valve 62B to the partition wall 59B vertically by the left and right edges in the periphery of the communication holes 66 and in the shape of a cross in between the communication holes 66 such that the flap valve 62B closes off the communication holes 66.

Figure 15:
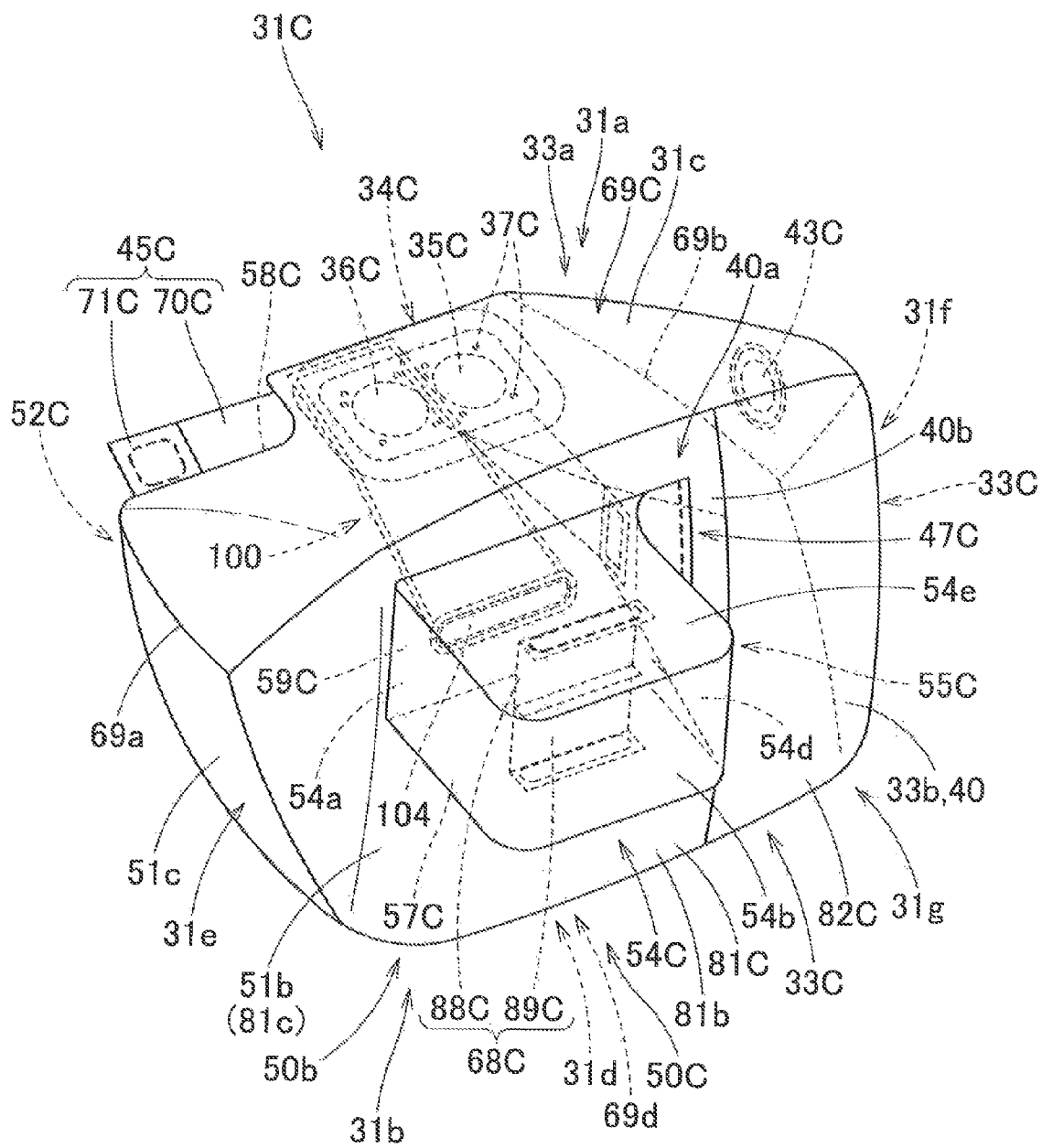
FIG. 15 is a schematic perspective view of an airbag of the third embodiment as fully inflated.
Figure 16:
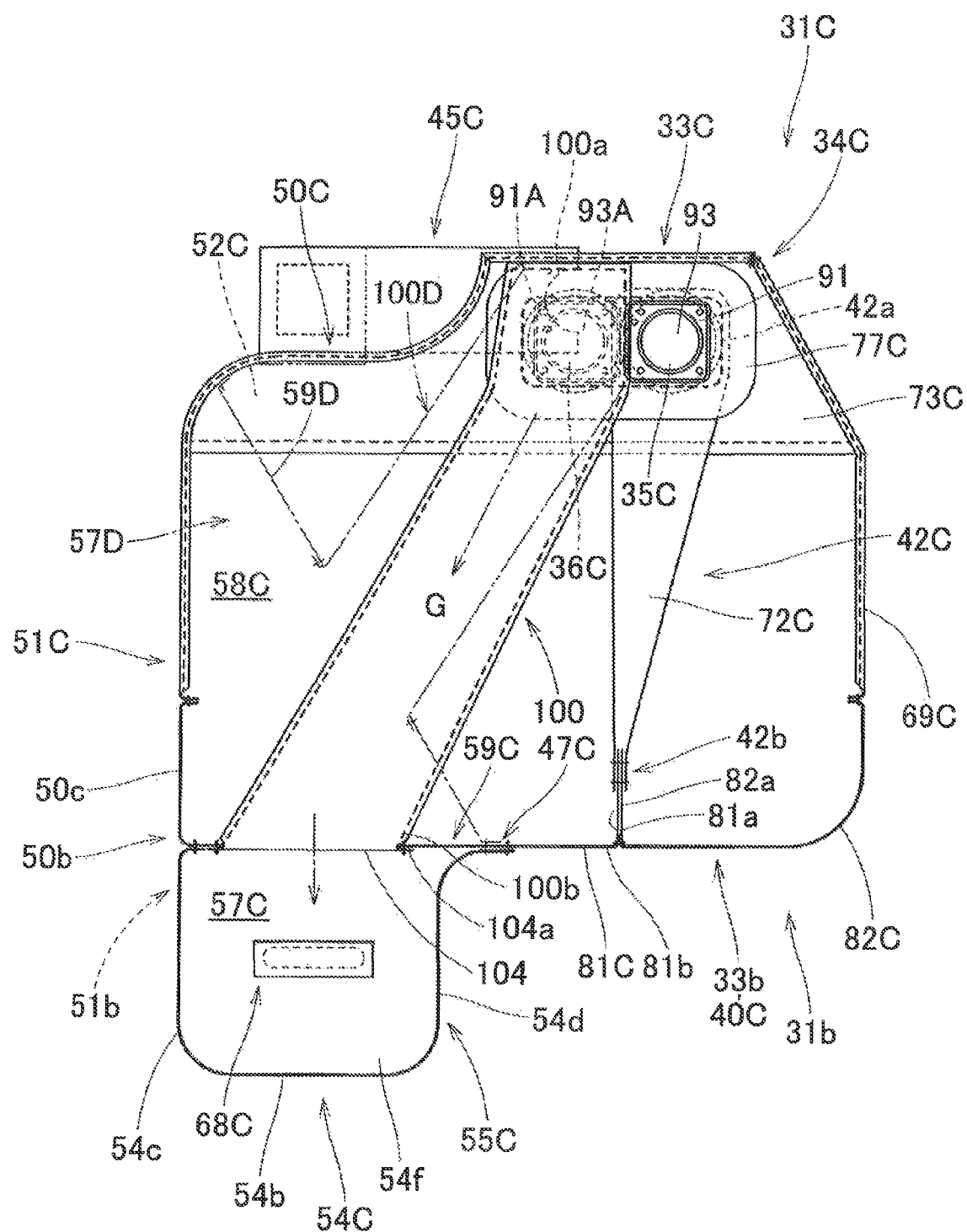
FIG. 16 is a schematic horizontal sectional view of the airbag of the third embodiment as fully inflated.
Figure 17:
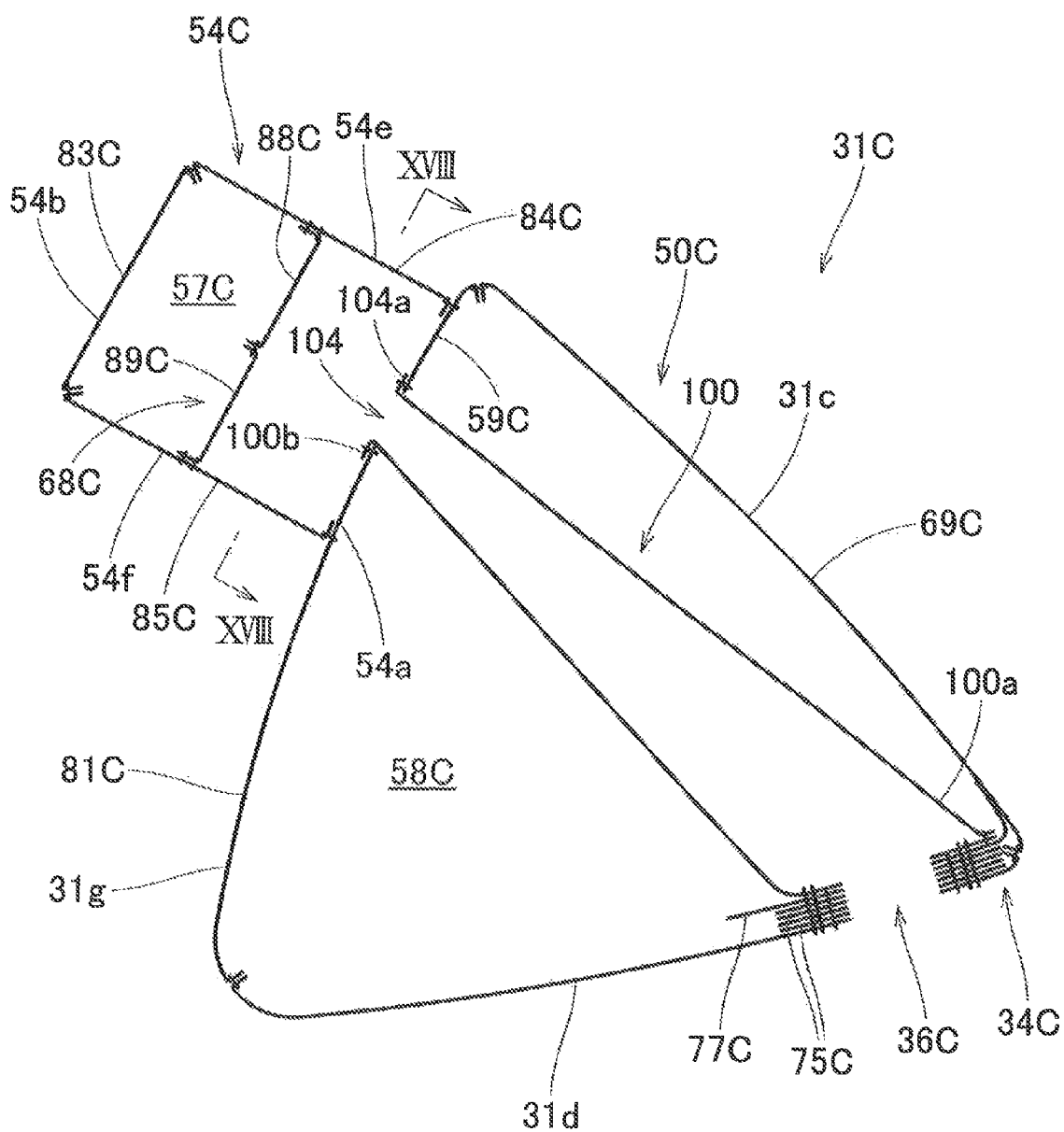
FIG. 17 is a schematic vertical sectional view of the airbag of the third embodiment as fully inflated.
Figure 18:
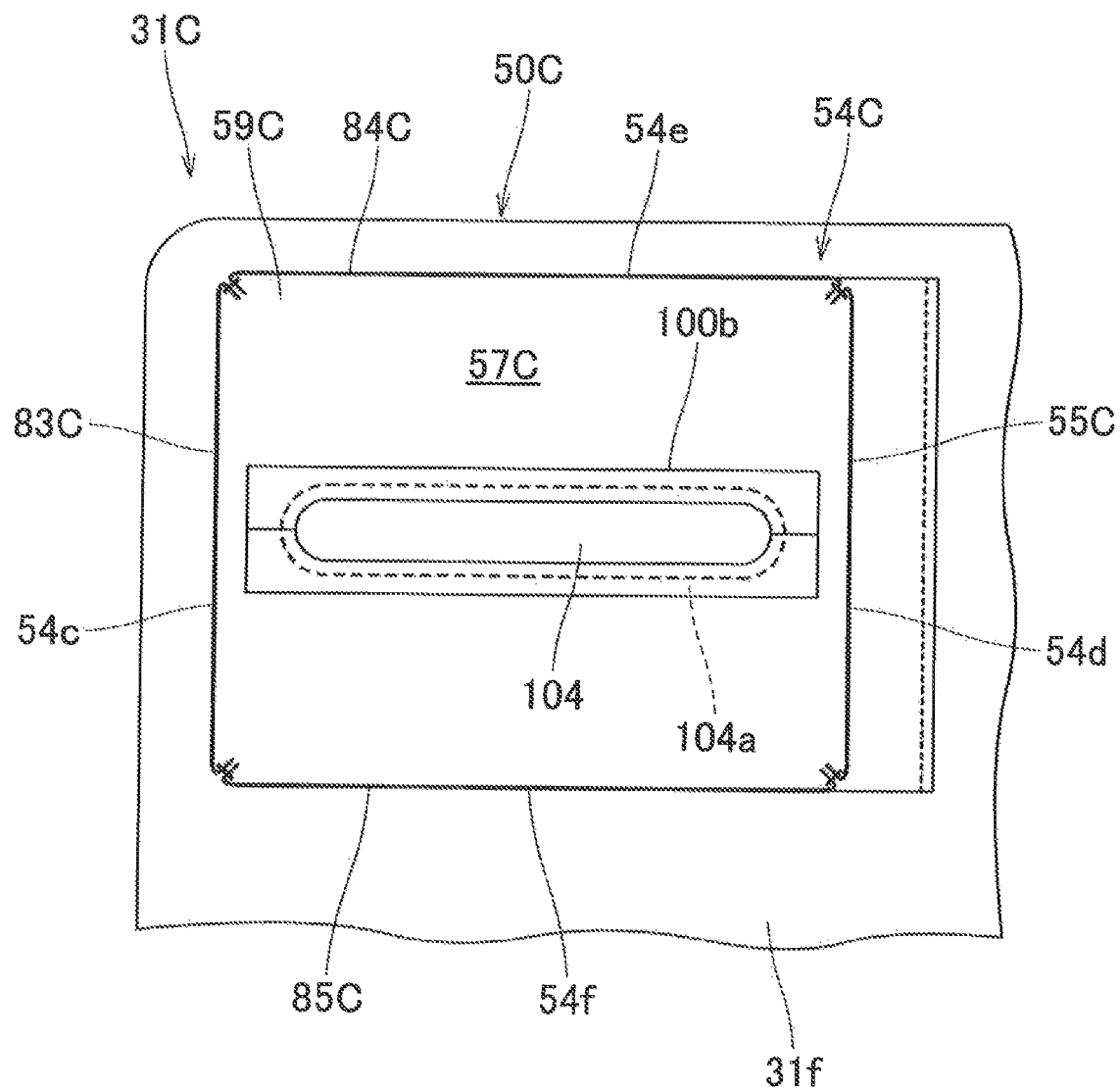
FIG. 18 is a schematic sectional view taken along line XVIII-XVIII of FIG. 17.
Figure 20:
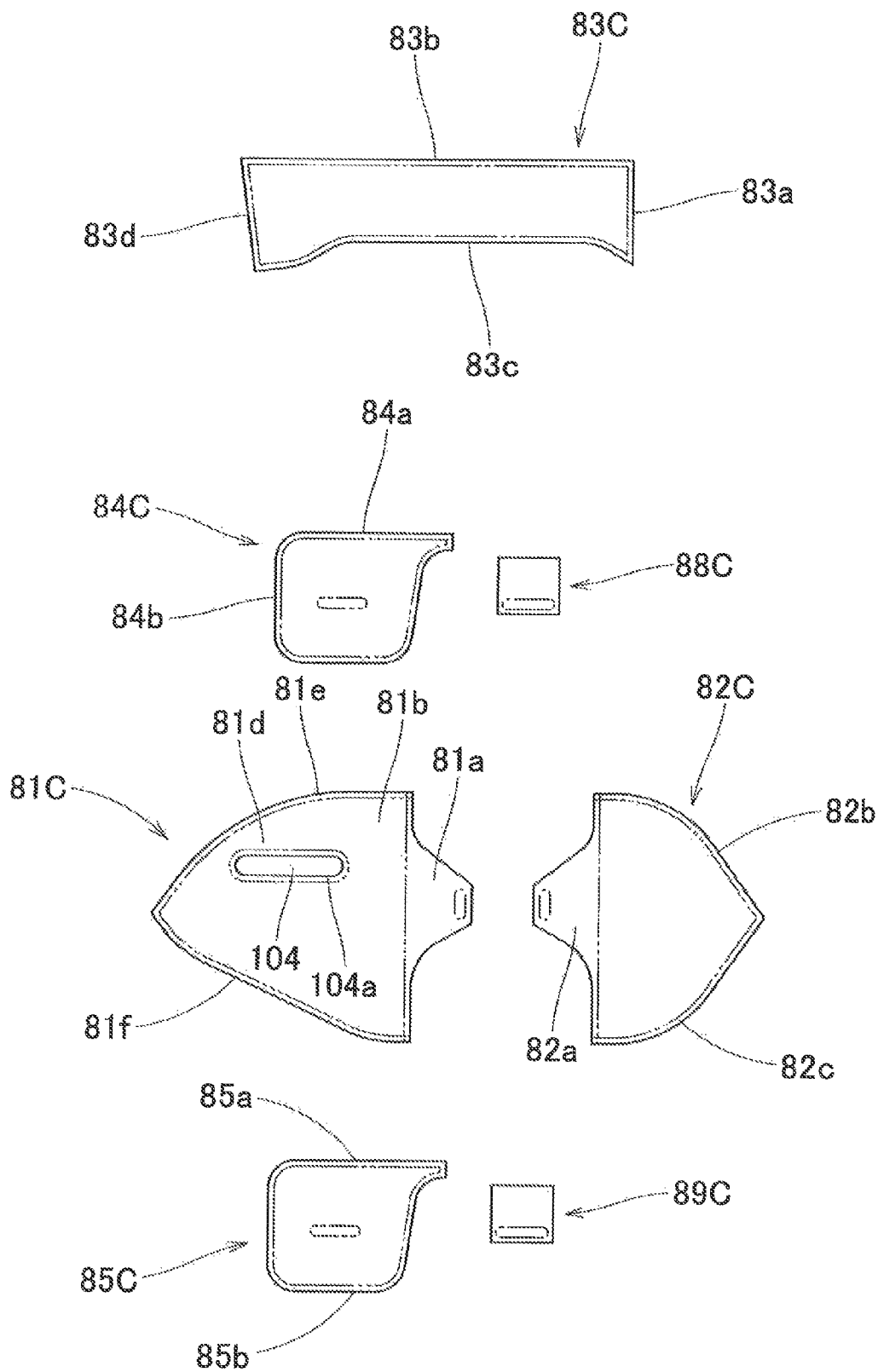

That is, the airbag 31B has such a configuration that the partition wall 59 is removed from the airbag 31 of the first embodiment and the flap valve 62B is disposed in the periphery of the communication holes 66 on the rear surface of the front wall 54a, An airbag 31C for an airbag device for a front passenger seat according to the third embodiment is now described. As shown in FIGS. 15 and 16, the outer contour of the airbag 31C as fully inflated is generally identical to that of the airbag 31 of the first embodiment. The airbag 31C has a generally similar configuration to the airbag 31 of the first embodiment except in including internally an inner tube 100 serving as an inflation gas supply mechanism, and therefore, "C" will be assigned to the ends of reference numerals of common members, and detailed descriptions of the common members will be omitted. As shown in FIG. 16, when viewing the airbag 310 as fully deployed from above, the partition wall 59C of the airbag 310 extends from the border 47C between the front-collision arresting plane 400 and oblique-collision arresting plane 55C in such a manner as to elongate the front-collision arresting plane 400, and is connected to the lateral 50c of the auxiliary bag section 50C facing towards the driver's seat 13, in a similar fashion to the airbag 31B of the second embodiment. That is, the high-pressure section 57C of the airbag 31C of the third embodiment is composed of the oblique-collision arresting section 54C only. As shown in FIGS. 16 to 18, the airbag 31C includes on the partition wall 59C a communication hole 104 whose peripheral edge 104a is jointed to the inner tube 100. In the illustrated embodiment, the communication hole 104 is a long hole extending generally in a left and right direction and is disposed at a generally center in an up and down direction of the partition wall 59C (FIG. 18). As shown in FIG. 20, the partition wall 59C is composed of a part of the rear panel 81C.

Figure 19:
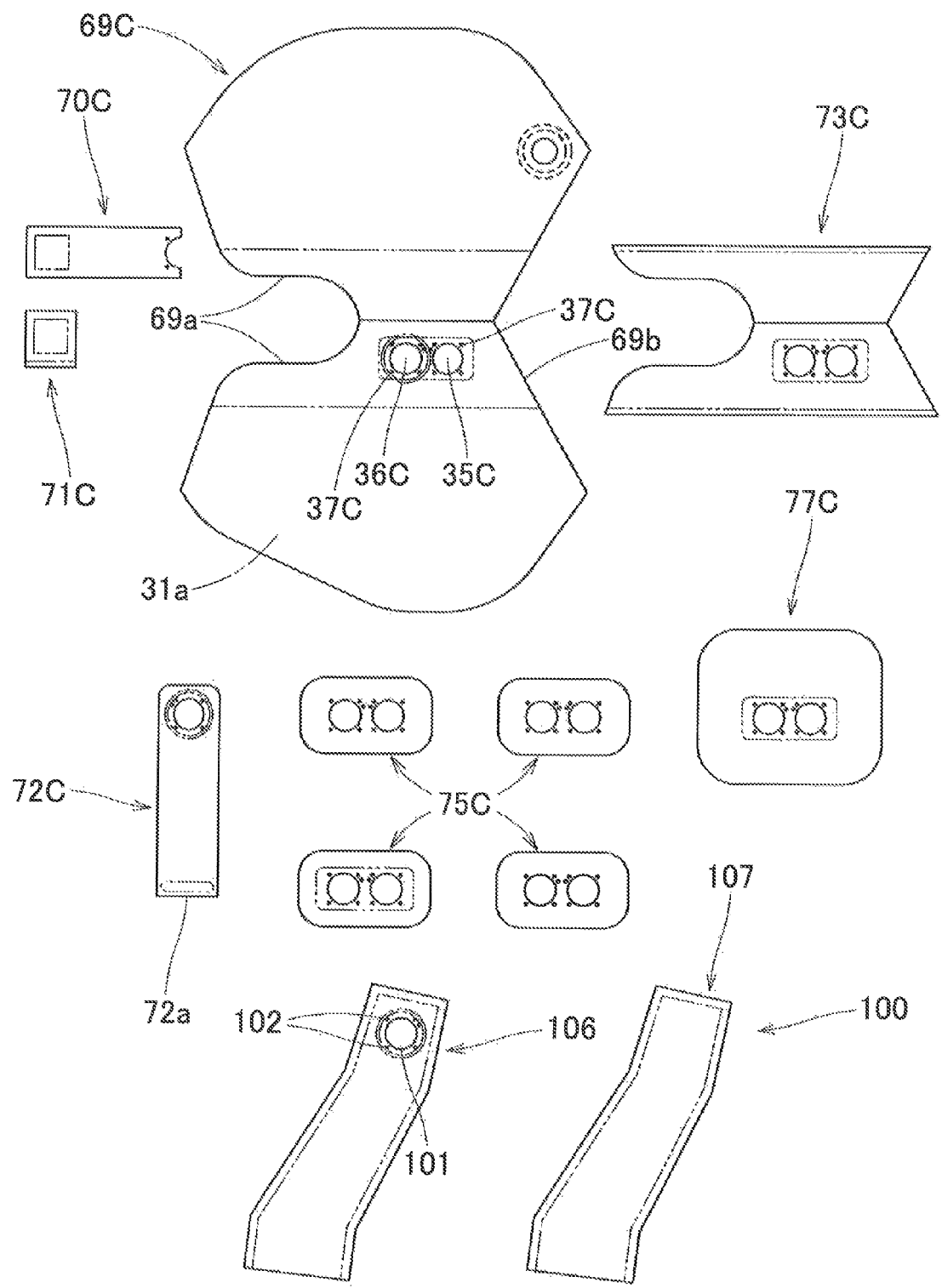
FIGS. 19 and 20 depict components of the airbag of the third embodiment.

As shown in FIGS. 15 to 17, the high-pressure section 57C of the third embodiment is configured to be fed with an inflation gas by one of the inflators (i.e., by the inflator 93A) via the inner tube 100 (i.e., the inflation gas supply mechanism) extending from the periphery of the inflator 93A. The inner tube 100 extends from the periphery of the inflator 93A disposed on the left side, and is tubular in outer contour. The root region 100a (the front end at deployment) of the inner tube 100 is closed off and the distal end region 100b (the rear end at deployment) is jointed (sewn) all over to the peripheral edge 104a of the communication hole 104 formed on the partition wall 59C. More specifically, the distal end region 100b of the inner tube 100 is put through the communication hole 104, and the hem of the distal end region 100b is applied to the peripheral edge 104a of the communication hole 104 on the inner circumferential plane of the oblique-collision arresting section 54C and sewn to the peripheral edge 104a of the communication hole 104 over an entire circumference (FIGS. 17 and 18). The inner tube 100 includes at the root region 100a a round mounting opening 101 corresponding to the inlet port 36C of the airbag 31C, as shown in FIG. 19, such that the inflator 93A is inserted there through from below. The peripheral edge of the mounting opening 101 is pressed down by the retainer 91A and is provided with insert holes 102 for receiving bolts 91a of the retainer 91A at such locations as to correspond to the mounting holes 37C of the airbag 31C. In the illustrated embodiment, the inner tube 100 is formed of a pair of generally identical band-shaped inner tube cloths 106 and 107 shown in FIG. 19. The cloths 106 and 107 are overlaid one above the other and sewn together by the outer circumferential edges except the distal end region with sewing threads, thus formed into the inner tube 100. The inner tube cloths 106 and 107 are formed of woven fabric of polyimide, polyester or the like.

That is, in the airbag device 30C for a front passenger seat according to the third embodiment, the inflator 93A disposed on the left side inflates the high-pressure section 57C while the inflator 93 on the right side inflates the low-pressure section 58C of the auxiliary bag section 50 and the main bag section 33C. In the third embodiment, since the inner tube 100 extends from the peripheral edge of the inflator 93A disposed on the left side, the front end 42a of the vertical tether 42C extends only from the peripheral edge of the inflator 93 disposed on the right side and is pressed down by the retainer 91 used to mount the inflator 93 on the case (FIG. 16). Further, unlike the airbag 31 of the first embodiment, the airbag 31C does not include in the oblique-collision arresting section 54C a tether for regulating a clearance between the front wall 54a and the right wall 54d forming the oblique-collision arresting plane 55C. The inflator 93A for inflating the high-pressure section 57C is designed to be actuated generally simultaneously with the inflator 93 for inflating the low-pressure section 58C and main bag section 33C.

With the airbag device 30C of the third embodiment, the high-pressure section 57C will be able to maintain a higher pressure than the low-pressure section 58C in a steady fashion since the high-pressure section 57C is fed with an inflation gas from the inflator 93A only via the inner tube 100 acting as the inflation gas supply mechanism. Further, the configuration of the airbag device 30C of the third embodiment will help control an internal pressure value, a start timing of pressure rise, a pressure-holding time or the like of each of the high-pressure section 57C and low-pressure section 58C adequately by adjusting an output, an actuation timing, a peak-pressure timing of each of the inflators 93 and 93A. Although the third embodiment employs two inflators 93 and 93A, the number of the inflators should not be limited thereby, but may be three or more including two inflators for inflating the low-pressure section of the auxiliary bag section and main bag section, by way of example, provided that a difference in internal pressure between the low-pressure section and high-pressure section is secured. Although the inflator 93A for feeding an inflation gas to the high-pressure section 57C is designed to be actuated generally simultaneously with the inflator 93 in the third embodiment, the inflator 93A may also be configured to start operating later or earlier than the inflator 93.

Figure 21:
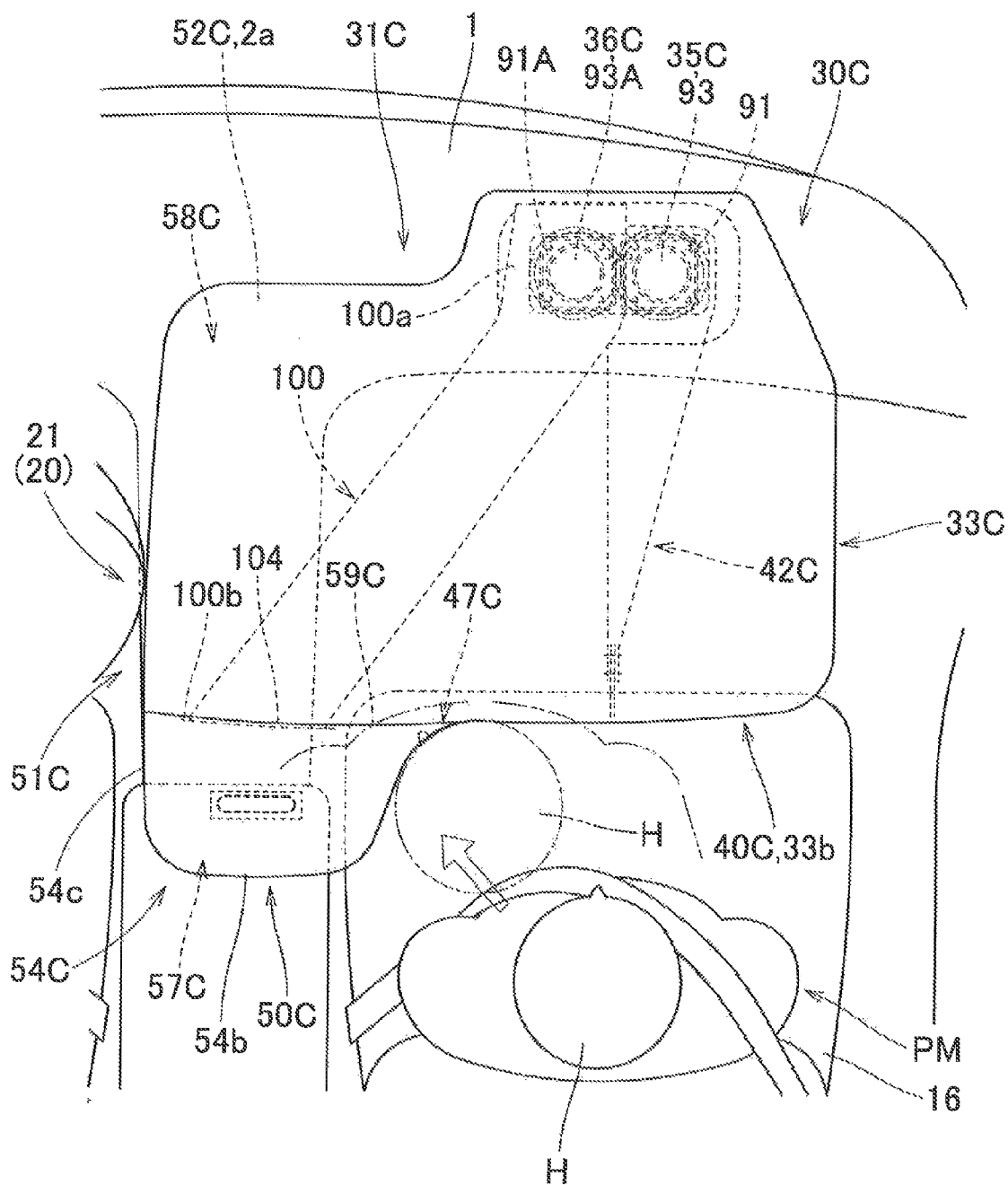
FIG. 21 is a schematic plan view of the airbag device of the third embodiment in service.

As shown in FIG. 21, also in the airbag device 30C of the third embodiment, the auxiliary bag section 50C of the airbag 31C includes at the front end 51a at airbag deployment a support plane 52C to be supported by the rear surface 2a of the center cluster 2 of the dashboard 1 at airbag deployment. With this configuration, when fully deployed, the auxiliary bag section 50C will not be likely to move forward at airbag deployment since the support plane 52C is supported by the rear surface 2a of the dashboard 1. Therefore the oblique-collision arresting section 54 will not easily move forward and be able to arrest the head H of the passenger PM without turning the head H.

Figure 22:
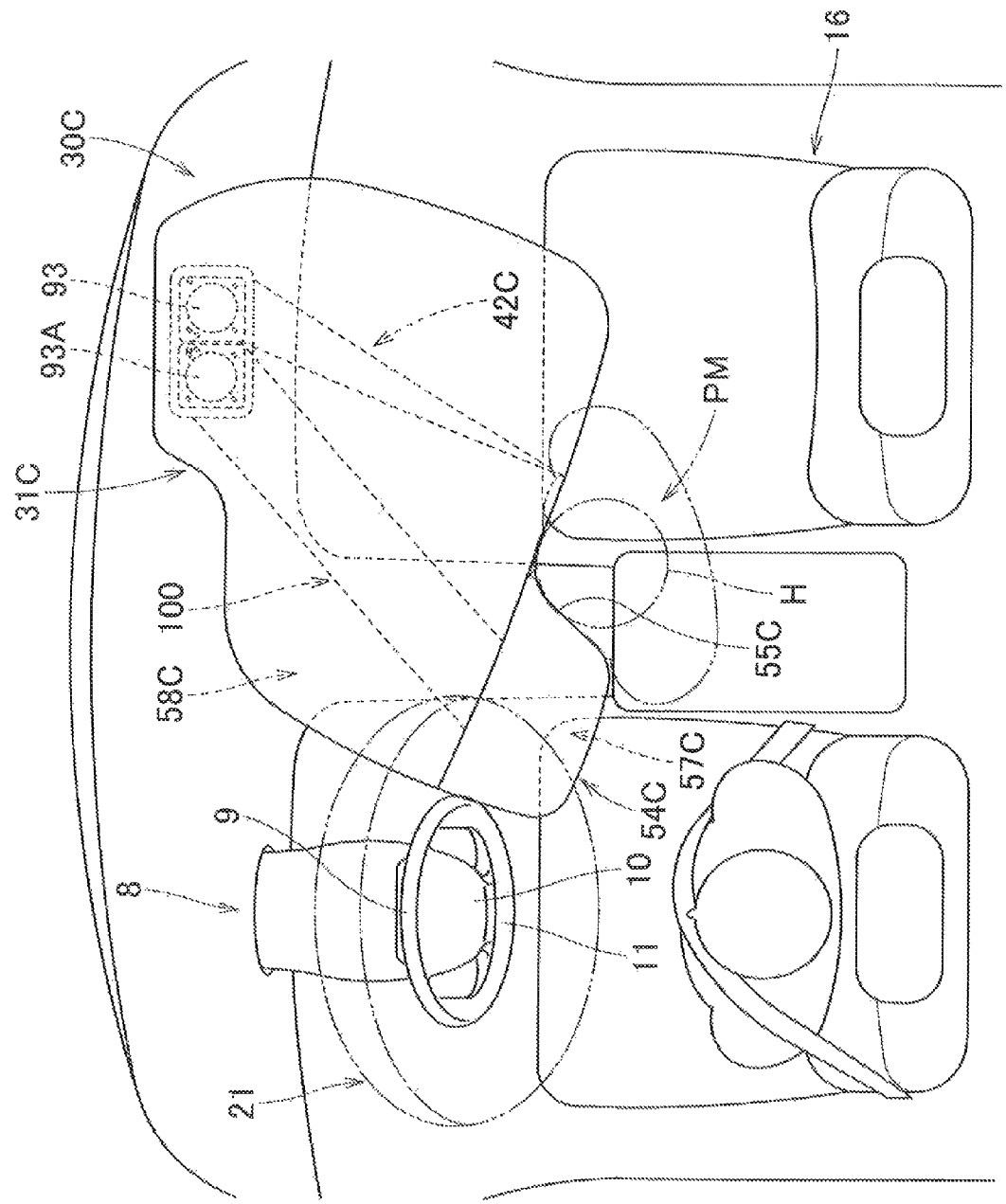
FIG. 22 is a schematic plan view of the airbag device of the third embodiment showing the way the airbag catches a passenger moving diagonally forward at deployment.

Moreover, in the airbag 31C of the third embodiment, the partition wall 59C extends from the border 47C between the front-collision arresting plane 40C and oblique-collision arresting plane 55C in such a manner as to elongate the front-collision arresting plane 40C, and is connected to the lateral 50c of the auxiliary bag section 50C facing towards the driver's seat 13. With this configuration, when the oblique-collision arresting section 54C catches the head H of the passenger PM moving diagonally forward at airbag deployment, the oblique-collision arresting section 54C will be supported by the steering wheel 9 as shown in FIG. 22. Therefore, the oblique-collision arresting section 54C will be able to catch the head H of the passenger PM moving diagonally forward with a reaction force gained from the steering wheel 9 without oscillating.

The contour of the partition wall should not be limited to that illustrated in the airbag 31C of the third embodiment, either. As indicated with double-dotted lines in FIG. 16, in a similar fashion to the airbag 31 of the first embodiment, the partition wall 59D may be so configured as to extend towards the driver's seat 13 (diagonally forward) from the vicinity of the border of the front-collision arresting plane 40C and oblique-collision arresting plane 55C to the front end region 51a (or on the support plane 52C) of the auxiliary bag section 50C, such that an inner tube 100D as indicated also with double-dotted lines in FIG. 16 is jointed to such a partition wall 59D. With such a partition wall 59D, the front end region of the high-pressure section 57D is located in the support plane 52C which is to be supported by the rear surface 2a of the dashboard 1 at airbag deployment, such that the high-pressure section 57D will be able to secure a reaction force for counteracting a diagonally forward direction directly from the dashboard 1, thus catching the head H of the passenger PM moving diagonally forward in the event of an oblique collision in a further steady fashion.

Further, in the third embodiment, the hem of the distal end region 100b of the inner tube 100 is applied to the peripheral edge 104a of the communication hole 104 on the inner circumferential plane of the oblique-collision arresting section 54C (i.e., on the rear plane of the partition wall 59C) and sewn to the peripheral edge 104a of the communication hole 104, thus the distal end region 100b of the inner tube 100 is jointed to the partition wall 59C. However, the way to joint the distal end region of the inner tube to the partition wall should not be limited thereby. By way of example, before jointing, the hem of the distal end region of the inner tube may be applied to the front plane of the partition wall in the peripheral edge of the communication hole, or alternatively the peripheral edge of the communication hole may be bent forward to be sewn to the hem of the inner tube. Further alternatively, a separate patch may be applied to the hem of the distal end region of the inner tube put through the communication hole and to the peripheral edge of the communication hole, either from outside or inside before the patch is sewn thereto, in order to joint the distal end region of the inner tube to the partition wall.

Furthermore, although not illustrated in the drawings, the airbag may be formed without such a partition wall and the distal end region of the inner tube extending from the peripheral edge of the inflator is sewn (jointed) all over directly to the front end region of the oblique-collision arresting section (to a vicinity of the border between the oblique-collision arresting section and the support inflatable region). In this configuration, the inner tube acts as the partition wall that partitions the high-pressure section and the low-pressure section.

The foregoing embodiments have been so described that the auxiliary bag section 50/50C is provided only on the left side of, or at an inboard side of, the main bag section 33/33C, facing towards the driver's seat 13. However, the auxiliary bag section may be disposed only on a lateral of the main bag section facing away from the driver's seat, i.e., only at an outboard side of the main bag section. Further alternatively, the auxiliary bag section may be disposed on both left and right sides of the main bag section, provided that the front-collision arresting plane 40/40C is able to catch a passenger PM smoothly without slanting in the event of a frontal collision of a vehicle. In that instance, volumes of low-pressure sections of the auxiliary bag sections may be differentiated from each other by adjusting volumes of high-pressure sections. Further, if the auxiliary bag section is disposed at only either one lateral of the main bag section, i.e., either only on a lateral of the main bag section facing towards the driver's seat or only on an outboard lateral of the main bag section, a protruding bag, which is similar in outer contour to the auxiliary bag section but formed of a low-pressure section only, may be provided on the opposite lateral of the main bag section.

Although the airbag 31/31B/31C of the foregoing embodiments includes at the front end 51a of the auxiliary bag section 50/50C the support plane 52/52C to be supported by the rear surface 2a of the dashboard at airbag deployment, the auxiliary bag section may also be configured not to be supported by the dashboard.

Although the oblique-collision arresting section 54/54C of the foregoing embodiments has been described as having such a dimension in an up and down direction as to be able to cover a head H of a passenger PM and protruding from the rear end of the auxiliary bag section 50/50C, the oblique-collision arresting section may also be so configured as to protrude from an entire area in an up and down direction of the rear end of the auxiliary bag section 50/50C, i.e., with a generally equal dimension in an up and down direction to the front-collision arresting plane 40/40C.

What is claimed is:

1. An airbag device for a front passenger seat adapted to be mounted on an instrument panel of a vehicle in front of a front passenger seat and comprising a housing adapted to be disposed in the instrument panel and an airbag housed in the housing in a folded-up configuration and being inflatable with an inflation gas for deployment rearward in order to protect a passenger seated in the front passenger seat, the airbag comprising:

- an inflatable main bag section that includes at a rear surface thereof a front-collision arresting plane for catching the passenger moving forward in the event of a frontal collision of the vehicle;
- an auxiliary bag section that is deployable on a lateral in a left and right direction a of the main bag section and inflatable into such a shape as to protrude rearward relative to an edge in a left and right direction of the front-collision arresting plane, the auxiliary bag section including an oblique-collision arresting section that protrudes rearward relative to the main bag section, the oblique-collision arresting section including on a lateral thereof an oblique-collision arresting plane extending rearward in such a manner as to be continuous with the front-collision arresting plane for catching a head of the passenger moving diagonally forward in the event of an oblique collision of the vehicle;
- a high-pressure section that is composed of a region of the auxiliary bag section including at least the oblique-collision arresting section and is higher in internal pressure than the main bag section when inflated; and
- a low-pressure section that is disposed in front of the oblique-collision arresting section in the auxiliary bag section, the low-pressure section being in gas communication with the main bag section and partitioned from the high-pressure section by a partition wall and having a lower internal pressure than the oblique-collision arresting section.

2. The airbag device for a front passenger seat of claim 1, wherein:
- an inflator is disposed in the housing for feeding an inflation gas to the airbag;
- the main bag section is so deployable as to extend rearward from the housing; and
- the high-pressure section includes in the partition wall a check valve acting as an inflation gas supply mechanism, the check valve allowing the inflation gas to flow into the high-pressure section from the low-pressure section and preventing the gas from flowing into the low-pressure section from the high-pressure section.

3. The airbag device for a front passenger seat of claim 1, wherein:
- at least two inflators are disposed in the housing for feeding an inflation gas to the airbag; and
- the high-pressure section is fed with an inflation gas by one of the inflators via an inner tube that extends from a periphery of the one inflator and acts as an inflation gas supply mechanism.

4. The airbag device for a front passenger seat of claim 1, wherein:
- when viewing the airbag as fully deployed from above,
- the partition wall of the airbag extends diagonally forward from a rear end of the partition wall located at a vicinity of a border between the front-collision arresting plane and the oblique-collision arresting plane; and
- a front end of the partition wall is located in a front end region of the auxiliary bag section not beyond an intersecting region of the front end region of the auxiliary bag section and a lateral of the auxiliary bag section.

5. The airbag device for a front passenger seat of claim 1, wherein:
- when viewing the airbag as fully deployed from above,
- the partition wall of the airbag extends diagonally forward from a rear end of the partition wall located at a vicinity of a border between the front-collision arresting plane and the oblique-collision arresting plane; and
- a front end of the partition wall is located at a lateral of the auxiliary bag section.

6. The airbag device for a front passenger seat of claim 1, wherein, when viewing the airbag as fully deployed from above, the partition wall of the airbag extends from a border between the front-collision arresting plane and the oblique-collision arresting plane in such a manner as to elongate the front-collision arresting plane, and is connected to a lateral of the auxiliary bag section.

7. The airbag device for a front passenger seat of claim 1, wherein the auxiliary bag section includes at a front end thereof at deployment a support plane that is supported by a rear surface of the instrument panel at airbag deployment.

8. The airbag device for a front passenger seat of claim 1, wherein the auxiliary bag section is disposed on a lateral of the main bag section deployable facing towards a driver's seat of the vehicle.

9. The airbag device for a front passenger seat of claim 8, wherein:
- when viewing the airbag as fully deployed from above,
- the partition wall of the airbag extends diagonally forward and toward the driver's seat from a rear end of the partition wall located at a vicinity of a border between the front-collision arresting plane and the oblique-collision arresting plane; and
- a front end of the partition wall is located farther forward relative to a steering wheel disposed in front of the driver's seat.

* * * * *